(12) United States Patent
Schaffer et al.

(10) Patent No.: US 11,661,668 B2
(45) Date of Patent: May 30, 2023

(54) PROCESSES, SYSTEMS, AND APPARATUS FOR CYCLOTRON PRODUCTION OF TECHNETIUM-99M

(71) Applicant: TRIUMF INC., Vancouver (CA)

(72) Inventors: Paul Schaffer, Richmond (CA); Francois Benard, West Vancouver (CA); Kenneth R. Buckley, Vancouver (CA); Victoire Hanemaayer, Maple Ridge (CA); Cornelia Manuela Hoehr, Vancouver (CA); Julius Alexander Klug, Vancouver (CA); Michael S. Kovacs, London (CA); Thomas J. Morley, New Haven, CT (US); Thomas J. Ruth, Vancouver (CA); John Valliant, Ancaster (CA); Stefan K. Zeisler, Vancouver (CA); Maurice G. Dodd, Chilliwack (CA)

(73) Assignee: TRIUMF INC., Vancouver (CA)

( * ) Notice: Subject to any disclaimer, the term of this patent is extended or adjusted under 35 U.S.C. 154(b) by 0 days.

(21) Appl. No.: 17/345,719

(22) Filed: Jun. 11, 2021

(65) Prior Publication Data

US 2021/0335515 A1    Oct. 28, 2021

Related U.S. Application Data

(63) Continuation of application No. 16/894,691, filed on Jun. 5, 2020, now abandoned, which is a continuation
(Continued)

(51) Int. Cl.
*G21G 1/00* (2006.01)
*C25D 13/02* (2006.01)
(Continued)

(52) U.S. Cl.
CPC ............. *G21G 1/001* (2013.01); *B22F 1/145* (2022.01); *C25D 13/02* (2013.01); *C25D 13/22* (2013.01);
(Continued)

(58) Field of Classification Search
CPC .. G21G 1/00; G21G 1/001; G21G 2001/0036; G21G 2001/0042;
(Continued)

(56) References Cited

U.S. PATENT DOCUMENTS

| 2,504,585 A | 4/1950 | Reid |
| 4,762,695 A | 8/1988 | Endo et al. |

(Continued)

FOREIGN PATENT DOCUMENTS

| CA | 2788615 A1 | 8/2011 |
| EP | 3197246 A1 | 9/2018 |

(Continued)

OTHER PUBLICATIONS

Cheng et al. "Study on production of technetium-99m isotope with a compact cyclotron", Nuclear Science Journal (2000), 37(5), 328-339.
(Continued)

*Primary Examiner* — Sharon M Davis
(74) *Attorney, Agent, or Firm* — Innovators Legal

(57) ABSTRACT

A system for producing technetium-99m from molybdate-100. The system comprises: a target capsule apparatus for housing a Mo-100-coated target plate; a target capsule pickup apparatus for engaging, and delivering the target cell apparatus into a target station apparatus; target station apparatus for receiving and mounting therein the target capsule apparatus. The target station apparatus is engaged with a cyclotron for irradiating the Mo-100-coated target plate with protons. The irradiated target capsule apparatus is trans-
(Continued)

ferred to a receiving cell apparatus comprising a dissolution/purification module for receiving therein a proton-irradiated Mo-100-coated target plate. A conveyance conduit infrastructure interconnects: (i) the target capsule pickup apparatus with the target station apparatus, (ii) the target station apparatus and the receiving cell apparatus; and (iii) the receiving cell apparatus and the dissolution/purification module.

13 Claims, 29 Drawing Sheets

Related U.S. Application Data of application No. 15/581,544, filed on Apr. 28, 2017, now abandoned, which is a continuation of application No. 13/870,830, filed on Apr. 25, 2013, now abandoned.

(60) Provisional application No. 61/640,610, filed on Apr. 30, 2012, provisional application No. 61/639,408, filed on Apr. 27, 2012.

(51) Int. Cl.
| | |
|---|---|
| *C25D 13/22* | (2006.01) |
| *G21F 5/14* | (2006.01) |
| *G21K 5/08* | (2006.01) |
| *B22F 1/145* | (2022.01) |
| *H05H 6/00* | (2006.01) |
| *B22F 7/02* | (2006.01) |
| *G21G 1/10* | (2006.01) |
| *B22F 3/10* | (2006.01) |

(52) U.S. Cl.
CPC ............... *G21F 5/14* (2013.01); *G21K 5/08* (2013.01); *B22F 3/10* (2013.01); *B22F 7/02* (2013.01); *B22F 2998/10* (2013.01); *B22F 2999/00* (2013.01); *G21G 1/10* (2013.01); *G21G 2001/0042* (2013.01); *H05H 6/00* (2013.01)

(58) Field of Classification Search
CPC .. G21G 2001/06; G21G 2001/10; G21K 5/08; G21K 5/10
See application file for complete search history.

(56) References Cited

U.S. PATENT DOCUMENTS

| | | | |
|---|---|---|---|
| 2001/0049981 A1 | 12/2001 | Mccormick | |
| 2004/0000637 A1* | 1/2004 | Wieland | G21G 1/10 |
| | | | 250/284 |
| 2007/0205381 A1 | 9/2007 | Nakao | |
| 2007/0297554 A1* | 12/2007 | Lavie | G21G 1/10 |
| | | | 376/190 |
| 2010/0329406 A1 | 12/2010 | Norling et al. | |
| 2011/0002431 A1 | 1/2011 | Johnson et al. | |
| 2011/0233480 A1 | 9/2011 | Hayashi | |
| 2011/0280356 A1* | 11/2011 | Tsang | G21G 1/08 |
| | | | 376/189 |
| 2013/0301769 A1 | 11/2013 | Schaffer et al. | |
| 2014/0029710 A1 | 1/2014 | Wilson | |

FOREIGN PATENT DOCUMENTS

| | | | |
|---|---|---|---|
| JP | S61-295338 A | 12/1986 | |
| WO | 2008/073468 A1 | 6/2008 | |
| WO | WO-2008073468 A1 * | 6/2008 | ............... H05H 6/00 |
| WO | 2011/004887 A1 | 1/2011 | |
| WO | 2012/039036 A1 | 3/2012 | |
| WO | 2013159201 A1 | 9/2018 | |

OTHER PUBLICATIONS

Morley et al. "An automated module for the separation and purification of cyclotron-produced 99mTcO4-", Nuclear Medicine and Biology, 39 (2012), 551-559.

Bakhtiari et al. "Encapsulated target for isotope production cyclotrons", Proceedings of the IEEE Particle Accelerator Conference (1998), vol. 3, 3842-3844.

Gushchin A. N. et al., "Target device for making radionuclides in a cyclotron", Instruments and Experimental Techniques, Consultants Bureau, New York, US, vol. 29, No. 6 (1986), pp. 1282-1284.

Felbauer, S. L. "Furnace Optimization: Meeting the Need to Reduce Costs" Heat Treating Progress, vol. 9, No. 1, Jan./Feb. 2009.

* cited by examiner

Fig. 15A
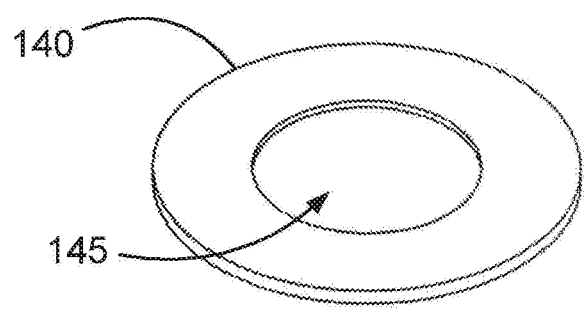
Fig 15B
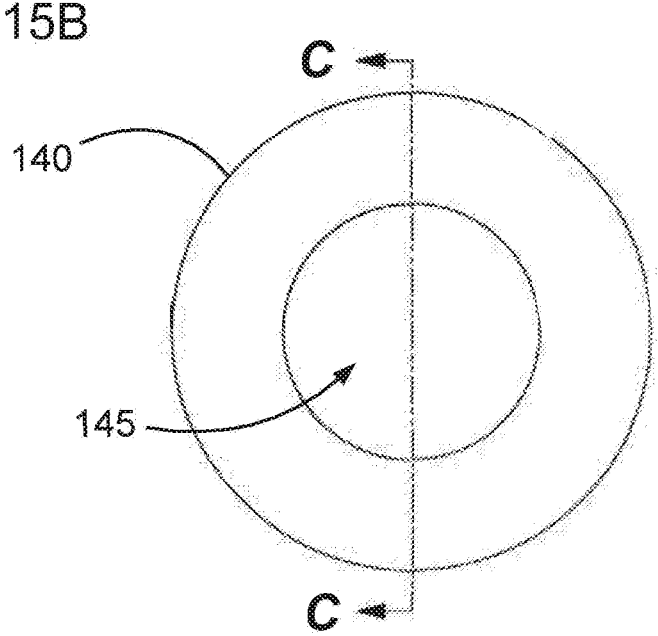
Fig. 15C
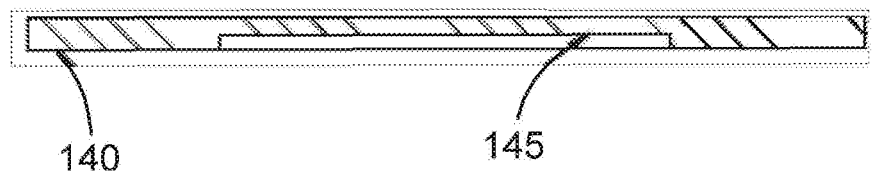
Fig. 15

PROCESSES, SYSTEMS, AND APPARATUS FOR CYCLOTRON PRODUCTION OF TECHNETIUM-99M

CROSS-REFERENCE TO RELATED APPLICATIONS

This application is a continuation of, and claims priority to, co-pending U.S. application Ser. No. 16/894,691, filed Jun. 5, 2020, is a continuation of application Ser. No. 15/581,544 filed on Apr. 28, 2017, which was a continuation of application Ser. No. 13/870,830 filed on Apr. 25, 2013, which claimed the benefit of U.S. Provisional Application No. 61/640,610, filed on Apr. 30, 2012, and U.S. Provisional Application No. 61/639,408, filed on Apr. 27, 2012, each of which are herein incorporated by reference in their entireties.

TECHNICAL FIELD

The present disclosure pertains to processes, systems, and apparatus, for production of technetium-99m. More particularly, the present pertains to production of technetium-99m from molybdenum-100 using accelerators such as cyclotrons.

BACKGROUND

Technetium-99m, referred to hereinafter as Tc-99m, is one of the most widely used radioactive tracers in nuclear medicine diagnostic procedures. Tc-99m emits readily detectable 140 keV gamma rays and has a half-life of only about six hours, thereby limiting patients' exposure to radioactivity. Depending on the type of nuclear medicine procedure, Tc-99m is bound to a selected pharmaceutical that transports the Tc-99m to its required location which is then imaged by radiology equipment. Common nuclear medical diagnostic procedures include tagging Tc-99m to sulfur colloids for imaging the liver, the spleen, and bone marrow, to macroaggregated albumin for lung scanning, to phosphonates for bone scanning, to iminodiacetic acids for imaging the hepatobiliary system, to glucoheptonates for renal scanning and brain scanning, to diethylenetriaminepentaacetic acid (DPTA) for brain scanning and kidney scanning, to dimercaptosuccinic acid (DMSA) for scanning the renal cortex, to red blood cells for blood pool scanning of the heart, to methoxy isobutyl isonitrile (MIBI) for imaging myocardial perfusion, for cardiac ventriculography, and to pyrophosphate for imaging, calcium deposits in damaged hearts. Tc-99m is also very useful for detection of various forms of cancer for example, by identification of sentinal nodes, i.e., lymph nodes draining cancerous sites such as breast cancer or malignant melanomas by first injecting a Tc-99m-labeled sulfur colloid followed by injection of a Tc-99m-labeled isosulfan blue dye. Immunoscintigraphy methods are particularly useful for detecting difficult-to-find cancers, and are based on tagging of Tc-99m to monoclonal antibodies specific to selected cancer cells, injecting the tagged monoclonal antibodies and then scanning the subject's body with radiology equipment.

The world's supply of Tc-99m for nuclear medicine is currently produced in nuclear reactors. First, the parent nuclide of Tc-99m, molybdenum-99 (referred to hereinafter as Mo-99) is produced by the fission of enriched uranium in several nuclear reactors around the world. Mo-99 has a relatively long half life of 66 hours which enables its world-wide transport to medical centers. Mo-99 is distributed in the form of Mo-99/Tc-99m generator devices using column chromatography to extract and recover Tc-99m from the decaying Mo-99. The chromatography columns are loaded with acidic alumina ($Al_2O_3$) into which is added Mo-99 in the form of molybdate, $MoO_4^{2-}$. As the Mo-99 decays, it forms pertechnetate $TcO_4^-$, which because of its single charge is less tightly bound to the alumina column inside of the generator devices. Pulling normal saline solution through the column of immobilized Mo-99 elutes the soluble Tc-99m, resulting in a saline solution containing the Tc-99m as the pertechnetate, with sodium as the counter-balancing cation. The solution of sodium pertechnetate may then be added in an appropriate concentration to the organ-specific pharmaceutical "kit" to be used, or sodium pertechnetate can be used directly without pharmaceutical tagging for specific procedures requiring only the $[Tc-99m]O_4^-$ as the primary radiopharmaceutical.

The problem with fission-based production of Tc-99m is that the several nuclear reactors producing the world-wide supply of Mo-99 are close to the end of their lifetimes. Almost two-thirds of the world's supply of Mo-99 currently comes from two reactors (i) the National Research Universal Reactor at the Chalk River Laboratories in Ontario, Canada, and (ii) the Petten nuclear reactor in the Netherlands. Both facilities were shut-down for extended periods of time in 2009-2010 which caused a serious on-going world-wide shortage of supply of Mo-99 for medical facilities. Although both facilities are now active again, significant concerns remain regarding reliable long-term supply of Mo-99.

It is known that medical cyclotrons can produce small amounts of Tc-99m from Mo-100 for research purposes. It has been recently demonstrated that Tc-99m produced in a cyclotron is equivalent to nuclear Tc-99m when used for nuclear medical imaging (Guerin et al., 2010, *Cyclotron production of $^{99mc}Tc$: An approach to the medical isotope crisis* J. Nucl. Med. 51(4):13N-16N). However, analyses of numerous studies reporting conversion of Mo-100 to Tc-99m show considerable discrepancies regarding conversion efficiencies, gamma ray production, and purity (Challan et al., 2007, *Thin target yields and Empire-II predictions in the accelerator production of technetium-99m*. J. Nucl. Rad. Phys. 2:1-; Takacs et al., 2003, *Evaluation of proton induced reactions on $^{100}Mo$: New cross sections for production of $^{99m}Tc$ and $^{99}Mo$*. J. Radioanal. Nucl. Chem. 257: 195-201; Lebeda et al., 2012, *New measurement of excitation functions for (p,x) reactions on $^{nat}Mo$ with special regard to the formation of $^{95m}Tc$, $^{96m+g}Tc$, $^{99m}Tc$ and $^{99}Mo$*. Appl. Radiat. Isot. 68(12): 2355-2365; Scholten et al., 1999, *Excitation functions for the cyclotron production of $^{99m}Tc$ and $^{99}Mo$*. Appl. Radiat. Isot. 51:69-80).

SUMMARY OF THE DISCLOSURE

The exemplary embodiments of the present disclosure pertain to processes for the production of technetium-99m (Tc-99m) from molybdenum-100 (Mo-100) by proton irradiation with accelerators such as cyclotrons. Some exemplary embodiments relate to systems for working the processes of present disclosure. Some exemplary embodiments relate to apparatus comprising the systems of the present disclosure.

DESCRIPTION OF THE DRAWINGS

The present disclosure will be described in conjunction with reference to the following drawings in which:

FIG. 15A is a plan view of an exemplary circular target plate according to one embodiment of the present disclosure, 15B is a top view, and FIG. 15C is a cross-sectional side view of the exemplary circular target plate from 15A;

FIG. 29A is a perspective view of the exemplary booster station from FIG. 28 with the cover removed and in a disengaged view, while FIG. 29B shows the booster station in an engaged mode.

DETAILED DESCRIPTION

Figure 1:
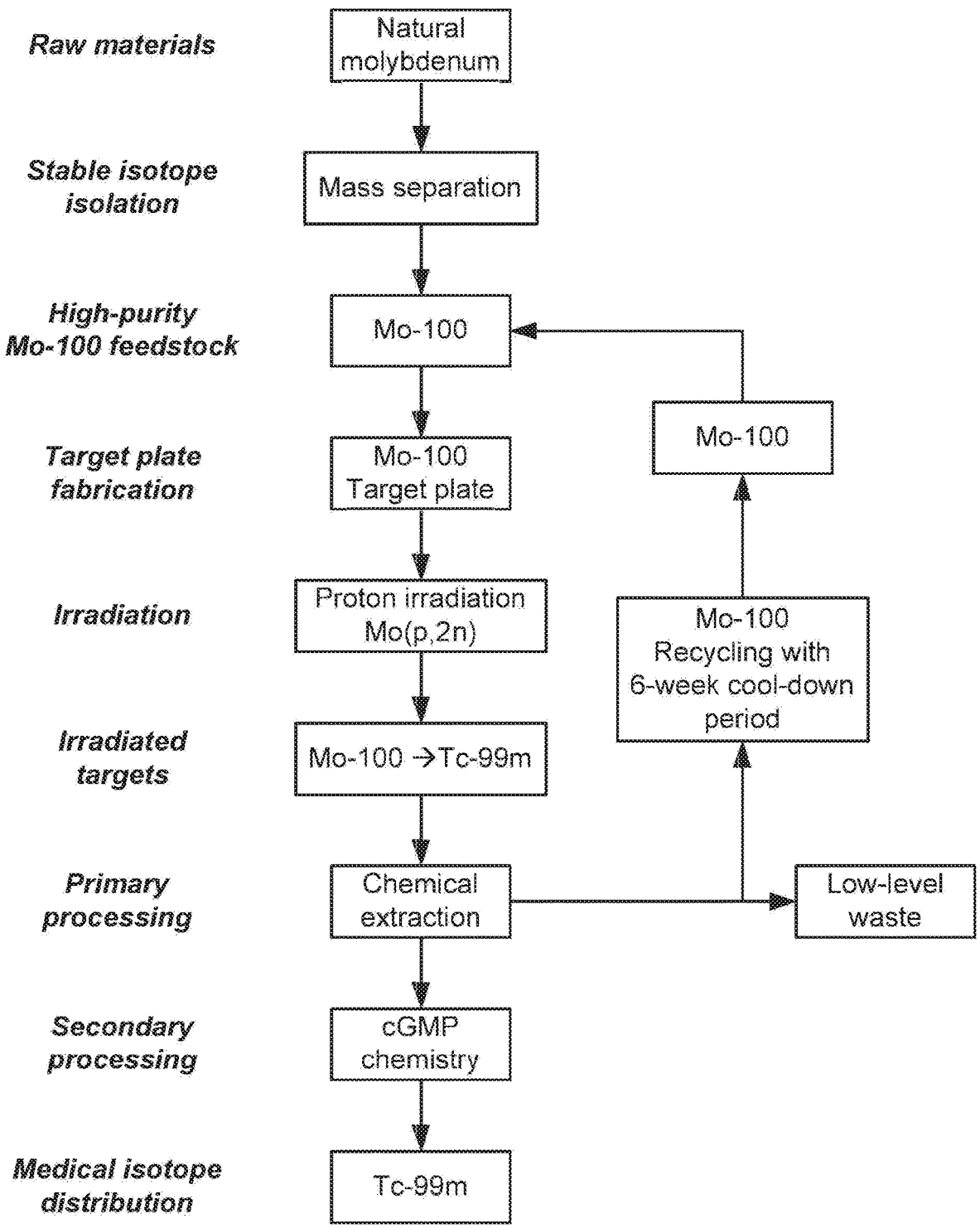
FIG. 1 is a schematic flowchart outlining an exemplary process of the present disclosure.

An exemplary embodiment of the present disclosure pertains to processes for producing Tc-99m by low-energy proton radiation of Mo-100 using proton beams produced by accelerators such as cyclotrons. Suitable proton energy for the processes of the present disclosure is from a range of about 10 MeV to about 30 MeV incident on the target. A flowchart outlining an exemplary process is shown in FIG. 1. The process generally follows the steps of:

1) Processing a supply of enriched Mo-100 metal powder to produce a Mo-100 powder with a consistent grain size of less than about 10 microns.

2) Depositing a coating of the processed Mo-100 powder onto a target plate comprising a transition metal, by electrochemical and/or electrophoretic deposition.

3) Sintering the coated target plate in an inert atmosphere for about 2 hours to about 10 hours at a temperature of about 1200° C. to about 2000° C.

4) Securely engaging the sintered target plate into a target holder. A target holder engaged with a sintered target plate is referred to herein as a target capsule assembly.

5) Installing the target capsule assembly into a receiving cell apparatus wherein the target capsule assembly is engaged by a target pickup apparatus. The target pickup cooperates with a target transfer drive apparatus for delivery of the target capsule assembly into a target station apparatus engaged with a cyclotron.

6) In an atmosphere that is substantially oxygen-free, irradiating the sintered target plate with supply of protons generated by an accelerator.

7) With a transfer drive apparatus, disengaging the target capsule assembly from the target station and transferring the target capsule assembly into receiving cell apparatus for separating and recovering molybdate ions and pertechnetate ions from the proton-irradiated target plate.

8) Separating the pertechnetate ions from the molybdate ions, purifying, and further processing the pertechnetate ions. These steps are done under precisely controlled environmental conditions to minimize, losses of the pertechnetate ions.

9) Recovering and purifying the molybdate ions to make them suitable for re-use in coating target plates.

Previous uses of accelerators for producing Tc-99m from Mo-100 were focused on producing small quantities of product sufficient for research use and for comparison of thus-produced Tc-99m functionality in medical, diagnostic imaging with the standard Tc-99m produced from Mo-99 using nuclear reactors. Commercially available enriched Mo-100 metal powders typically comprise mixtures of particle sizes ranging from less than a micron to more than a millimeter. Consequently, using such powders for coating target backing discs or backing plates results in uneven distribution of Mo-100 across the plate surfaces and varying thicknesses of Mo-100 deposition. Such variabilities result in target plate failures during irradiation with proton beams, in lowered conversion efficiencies of molybdenum atoms into technetium atoms, and in unpredictable yields of pertechnetate ions. Accordingly, it has become common practice to press commercial-grade Mo-100 powders at pressures of about 25,000 N to about 100,000 N into pellets having diameters in the range of 6.0 to 9.5 mm. Mo-100 pellets are then reduced in a hydrogen atmosphere at temperatures in the range of 800° C. to 900° C. Mo-100 is typically mounted onto a target backing disc either as commercial-grade Mo-100 powders or alternatively as sintered Mo-100 pellets by pressing, or by are melting, or electron beam melting. The melting methods generally use currents from a range of 40 mA to 70 mA which are applied in a variety of sweeping patterns and focusing patterns. Consequently, using, such powders and/or pellets for coating target plates results in uneven distribution of Mo-100 across the plate surfaces and in varying thicknesses of Mo-100 deposition. Such variabilities result in: (i) target plate failures during irradiation with proton beams, (ii) in lowered conversion efficiencies of molybdenum atoms into technetium atoms, and (iii) in unpredictable yields of pertechnetate ions. Other problems commonly encountered are associated with the target discs themselves. The targets typically used in the research-scale Tc-99m production in cyclotrons comprise small thin discs of copper or tantalum having diameters generally in the range of about 5-6 mm. Such discs can not be loaded with sufficient Mo-100 to enable large-scale production of Tc-99m, because they are mechanically fragile and may fail, i.e., fragment, under proton irradiation due to the very high levels of heat concomitantly generated. There are numerous challenges and issues that must be addressed in order to successfully scale Tc-99m production from Mo-100 using, cyclotron-based systems. Issues related to the molybdenum that need to be addressed include overcoming the problems of: (i) inability to deposit thick layers of Mo-100 onto target plates by galvanic plating from aqueous solutions, (ii) isotopically enriching molybdenum to facilitate production of specific technetium isotopes, and (iii) requirements for concentrated acid solutions and tor extended periods of time for dissolving irradiated plates of molybdenum. Challenges that need to be solved to facilitate commercial-scale production of Tc-99m production from Mo-100 using cyclotron-based systems, include selection of and configuring of suitable target backing plate materials: (i) to which mo-100 will strongly adhere to before and during proton irradiation, (ii) that are impervious to penetration byprotons (iii) that are sufficiently mechanically robust to withstand heating during proton irradiation, (iv) that are thin enough to enable heat dissipation and/or cooling of the Mo-100 during irradiation, and (iv) are (iv) are chemically inert, i.e., will not chemically contaminate or otherwise interfere with dissolution of the irradiated Mo-100.

Accordingly, some exemplary embodiments of the present disclosure relate to a process for refining commercial Mo-100 powders into uniform particles of less than 10 microns, to mechanically robust target plates for mounting thereon of the refined Mo-100 particles, and to electrophoretic methods for mounting the relined Mo-100 particles onto the targets plates.

According to one aspect, commercial-grade Mo-100 metal powder is first oxidized in a solution comprising about 3% to about 40% hydrogen peroxide ($H_2O_2$). A particularly suitable concentration of $H_2O_2$ is about 30%. The mixture of Mo-100 and $H_2O_2$ is then heated to a range of about 40° C. to about 50° C. to denature residual $H_2O_2$, then dried to recover solid molybdenum oxide. The solid molybdenum oxide is converted back to Mo-100 metal using a three-stage heating process. In the first stage, the dried molybdenum oxide is heated for about 30 min at about 400° C. in an environment comprising about 2% hydrogen in an argon gas mixture to allow for the formation of $MoO_3$. After 30 min at 400° C., the temperature is then raised for the second stage of process, to about 700° C. for about 30 min to facilitate the reduction of $MoO_3$ to $MoO_2$. The temperature is then further raised for the third stage of the process, to about 1100° C. for about 30 min to reduce the $MoO_2$ to Mo-100 metal. Because $MoO_2$ sublimes at 1500° C., it is important to keep the temperature during the third stage within the range of about 1100° C. and about 1455° C., of about 1100° C. and about 1400° C., of about 1100° C. and about 1350° C., of about 1100° C. and about 1300° C., of about 1100° C. and about 1250° C., of about 1100° C. and about 1200° C. It is important to limit the atmospheric hydrogen content during the first stage of the process less than about 5%, about 4%, about 3%, and preferably at about 2% or less to control the rate of redaction of $MoO_3$ to $MoO_2$. Because the reduction of $MoO_2$ to Mo-100 is an endothermic reaction, it is suitable to use a high hydrogen atmosphere, or alternatively, a pure hydrogen atmosphere for third stage of this process. The processed Mo-100 powder produced by this three-stage process is characterized by a consistent grain size of less than 10 microns.

Another aspect of this embodiment of the present disclosure relates to electrophoretic processes for coating target backing plates with the refined Mo-100 powders having uniform particle sizes of less than 10 microns. A refined Mo-100 powder is suspended in a suitable polar organic solvent exemplified by, anhydrous nitromethane, nitroalkanes, isopropanol, and the like, and a suitable binder exemplified by zein, and then stirred vigorously at an ambient temperature selected from a range of about 15° C. to about 30° C. A cathode comprising a transition metal and an anode comprising a conductive metal exemplified by copper, are then submerged into the suspension. A potential of about 150 V to about 5000 V, about 200 V to about 4000 V, about 250 V to about 3000 V, about 300 V to about 2500 V, about 400 V to about 2000 V, about 500 V to about 1500 V is applied across the anode and cathode for a duration of time from about 2 min to about 30 min to cause deposition of the Mo-100 and the binder onto the cathode. A particularly suitable potential to apply across the anode and cathode is about 1200 V. The coated cathodes are then removed from the mixture and sintered by heating at a temperature from the range of about 1500° C. to about 2000° C., about 1300° C. to about 1900° C., about 1400° C. to about 1800° C., about 1400° C. to about 1700° C., for a period of time from the range of 2-7 h, 2-6 h, 4-5 h in an oxygen-free atmosphere provided by an inert gas exemplified by argon. We have discovered that this process enables deposition of a molybdenum metal layer onto target backing plates (also referred to herein as "target plates") with a density that is about 85% of the possible theoretical density.

Another, aspect of this embodiment pertains to target plates onto which is mountable Mo-100. The target plate configuration is suitable for irradiation by protons delivered: (i) with or without a beamline extending from a cyclotron, or alternatively (ii) in a self-shielded cyclotron chamber wherein beamlines are not used. The width of the target plate is sufficient to receive an entire beamspot of proton energy produced with a cyclotron, even when delivered to the target plate at a selected angle from about 7° to about 90° relative to the incident bean Beam spots typically generated in cyclotron beamlines are collimated at about 15-mm diameter. It is common to place a Mo-100-coated target plate at an angle to a protein hemline in which case, the irradiated surface area on the target plate will be an elongate spot of about 10 mm to about 15 mm by about 20 mm to about 80 mm. In self-shielded cyclotrons that do not use beamlines, the spaces for installing target plates are typically about 30 cm×30 cm×30 cm to by about 30 cm×30 cm×80 cm. Accordingly, for large-scale production of Tc-99m, it is desirable to have target plates that can be used in: (i) cyclotrons using beamlines such as those exemplified by TR PET cyclotrons manufactured by Advanced Cyclotron Systems Inc. (ACSI, Richmond, BC, CA); by Best Cyclotron Systems Inc. (Springfield, Va., USA), by IBA Industrial (Louvain-la-Neuve, Belgium), and (ii) in self-shielded cyclotrons that do net use beamlines as exemplified by GE®'s PETtrace® cyclotron systems (GE and PETtrace are registered trademarks of the General Electric Company, Schenectady, N.Y., USA). The exemplary target plates may be circular discs for irradiation by proton beams at a 90° to the target discs, or alternatively, elongate plates for irradiation by proton beams delivered angles of less than 90° to the target plates.

However, a significant problem that occurs during proton irradiation of Mo-100 is the generation of excessive heat. Accordingly, it is necessary to coat Mo-100 onto target backing plates that are good thermal conductors and readily dissipate heat. The problem with most suitable thermo-conductive metals is that they have relatively low melting points. According, there is a risk that target backing plates comprising a thermo-conductive metal that have been electophoretically coated with Mo-100, will melt during the sintering process disclosed herein for increasing the density of, and making adherent the coated Mo-100 powder is known that tantalum has a very high melting point, i.e., of about 3000° C. and greater. Therefore, it would appear that tantalum might be a preferred metal substrate for target backing plate configurations. However, a problem with tantalum is that this transition metal is not very heat conductive. Therefore, the use of tantalum for target backing plates requires keeping the target backing plates as thin as possible in order to provide some cooling by a coolant flow direct to and about the back of the target backing plates, while at the same time, providing sufficient thickness to absorb heat without fracturing or disintegration and to stop residual protons that may have exited the Mo-100 layer. Accordingly, we investigated various designs and configurations of tantalum target backing plates for coating thereonto of Mo-100. One approach was to machine a series of interconnected channels into the back of a tantalum target backing plate as exemplified in FIGS. 2 and 3. A flow of coolant is directed through the channels during proton irradiation, and thus dissipates some of the heat generated. However, we found that providing channels for coolant flow about the back of the tantalum target backing plate compromised the structural strength of the backing plates, i.e., they were quite flexible and would fracture under the stresses of coolant flow and proton irradiation. We have surprisingly discovered that the sintering process to densify an make adherent Mo-100 coated onto such tantalum target backing plates, also significantly hardens the tantalum substrate thereby making target backing plates mechanically robust and extremely durable in use during proton irradiation and concurrent pressurized circulation of a coolant about the back of the target backing plate through the channels provided therefore. We have determined that sintered Mo-100-coated target plates comprising tantalum are robust and are structurally stable when irradiated with over 130 microamps of 16.5 MeV protons, and when irradiated with over 300 microamps of 18.5 MeV protons while temperature is maintained at or below about 500° C. by a pressurized flow of a coolant about the back of the target backing plates.

The mass of Mo-100 required to produce a suitable target will depend on the size of the proton beam spot. The target should at least match or exceed the proton beam spot size. The density of Mo-100 is about 10.2 g/cm$^3$. Accordingly, the mass of Mo-100 required to coat a target plate will be about "density of Mo-100 X area of the target X thickness required" and is calculated for the type of beam line used i.e., for orthogonal irradiation or alternatively, for irradiation by proton beams delivered at angles of less than 90° to the target plates. It is to be noted that the mass of Mo-100 required will not be affected by delivery of protons at an angle to the target because the required thickness of the coating decreases at the same rate as the surface area increases, since only one axis of the beam projection is extended as a consequence of changing the angle of the target to the beam.

Table 1 provides a listing of the target thicknesses of molybdenum for deposition onto circular target plates for orthogonal irradiation with a proton beam (i.e., at about 90° to the plate) for each of three irradiation energies commonly used by cyclotrons.

TABLE 1

| Entrance energy (MeV) | Exit energy (MeV) | Range (μm) |
| --- | --- | --- |
| 16.5 | 10 | 313 |
| 18 | 10 | 401 |
| 22 | 10 | 664 |

Table 2 provides a listing of the target thicknesses of molybdenum for deposition of elongate target plates for proton irradiation at different angles to the target for each of the three irradiation energies listed in Table 1.

TABLE 2

| | Required thickness (μm) | | |
| --- | --- | --- | --- |
| Angle | 22-10 MeV | 18-10 MeV | 16.5-10 MeV |
| 90 | 664 | 401 | 313 |
| 85 | 661 | 399 | 312 |
| 80 | 654 | 395 | 308 |
| 75 | 641 | 387 | 302 |
| 70 | 624 | 377 | 294 |
| 65 | 602 | 363 | 284 |
| 60 | 575 | 347 | 271 |
| 55 | 544 | 328 | 256 |
| 50 | 509 | 307 | 240 |
| 45 | 470 | 284 | 221 |
| 40 | 427 | 258 | 201 |
| 35 | 381 | 230 | 180 |
| 30 | 332 | 201 | 157 |
| 25 | 281 | 169 | 132 |
| 20 | 227 | 137 | 107 |
| 15 | 172 | 104 | 81 |
| 10 | 115 | 70 | 54 |
| 7 | 81 | 49 | 38 |

Figure 2:
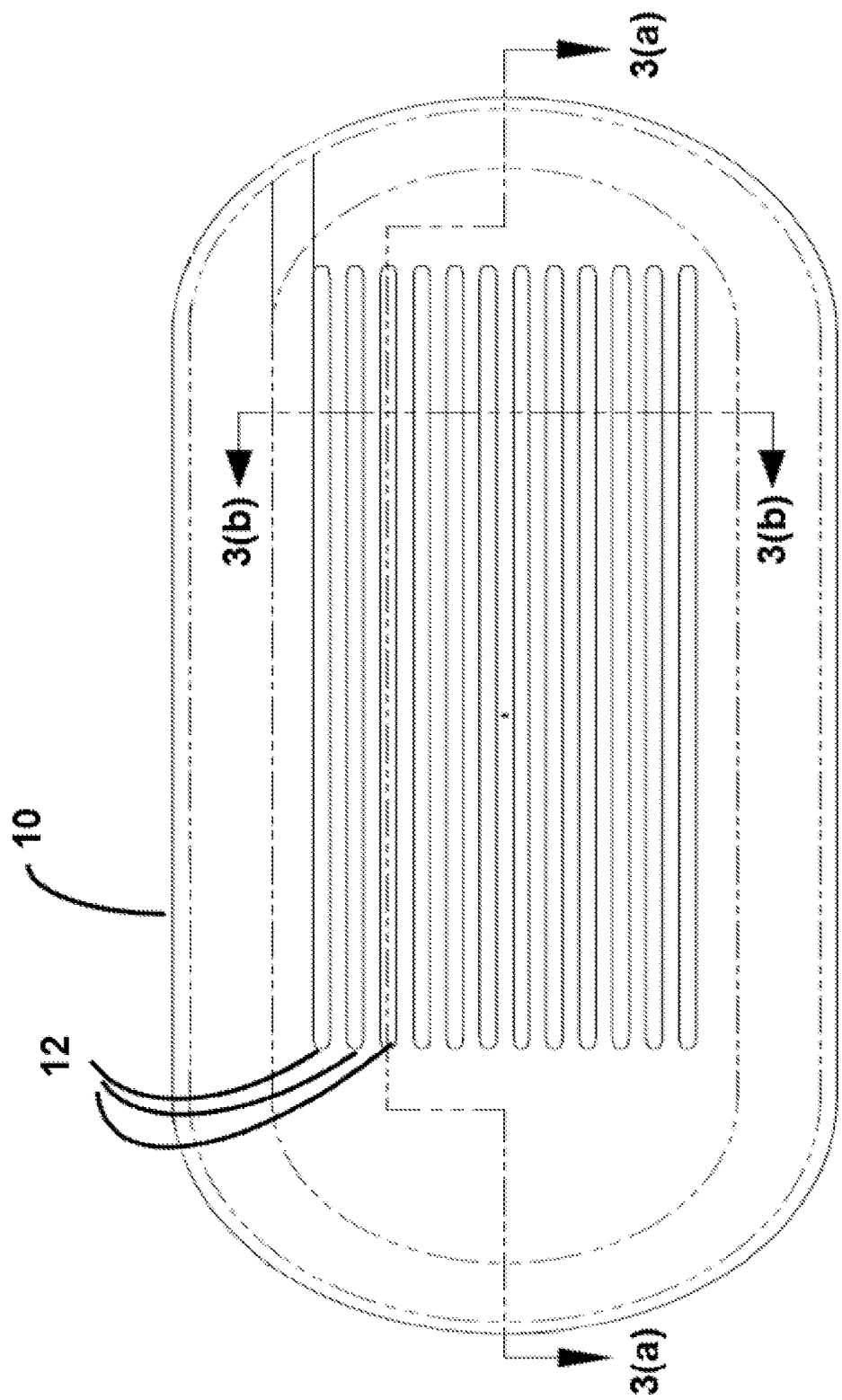
FIG. 2 is plan view of an exemplary elongate target plate according to one embodiment of the present disclosure.
Figure 3:
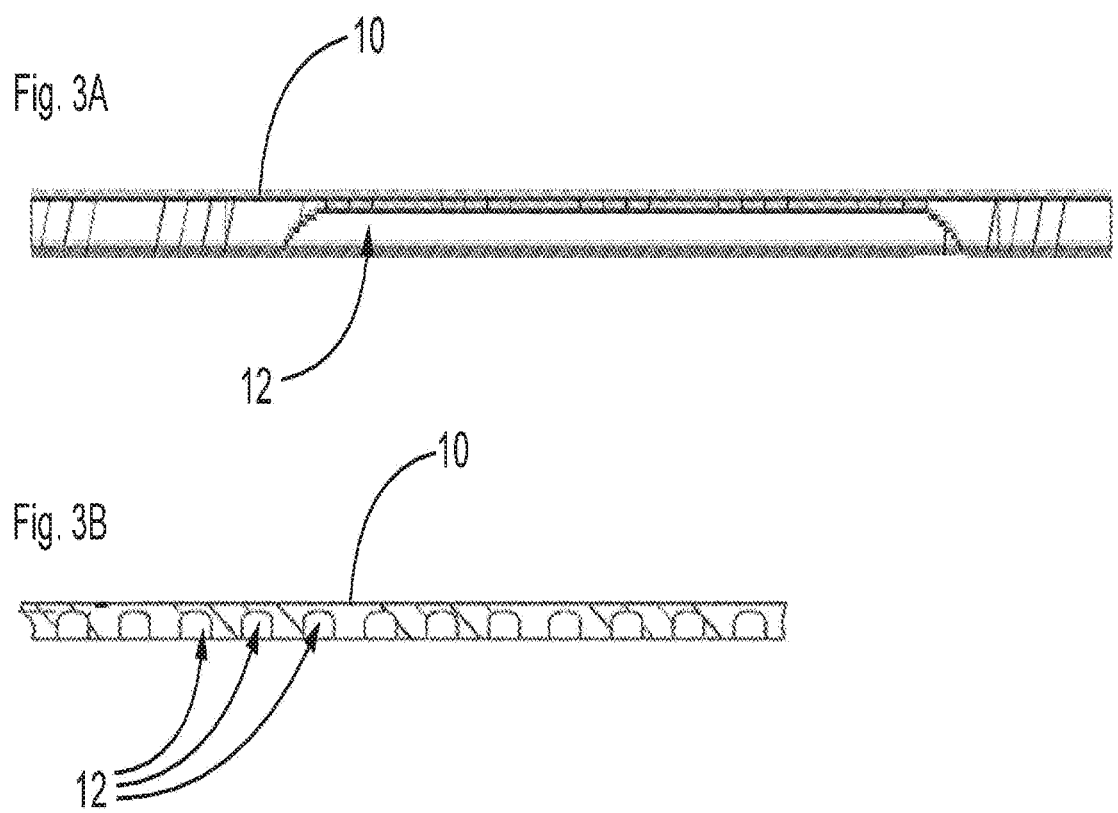
FIG. 3A is a cross-sectional side view and FIG. 3B is a cross-sectional end view of the exemplary target plate from FIG. 2.

An exemplary target plate 10 is shown in FIGS. 2-3, and has an elongate shape with rounded opposing ends. FIG. 2 is a top view of the exemplary target plate 10. FIG. 3A is a cross-sectional side view of the target plate 10, and FIG. 3B is a cross-sectional end view of the target plate 10. The thickness of the target plate 10 is sufficient to stop the entire proton beam at the maximum energy of 19 MeV, when no molybdenum is present. However, because of the high heat generated during proton irradiation, water channels 12 are provided in the underside of the target plate 10 to enable the circulation of a coolant underneath the target plate 10, to dissipate the excess heat. When coated with Mo-100, the target plate is capable of dissipating 300 μA of 18 MeV protons when delivered in an elliptical beam spot of about 10 mm by about 20 mm at an angle of 10° to the target plate while maintaining temperatures at about or below 500° C.

This exemplary target plate is about 105 mm long by 40 mm wide by 1.02 mm thick. The cathode i.e., the target plate can comprise any transition metal such as those exemplified by copper, cobalt, iron, nickel, palladium, rhodium, silver, tantalum, tungsten, zinc, and their alloys. Particularly suitable are copper, silver, rhodium, tantalum, and zinc. It is to be noted that if tantalum is used as the target plate material, the sintering process will also significantly harden the tantalum target plate making it extremely durable and able to withstand fracturing stresses resulting from proton irradiation and/or excessive heat produced during proton irradiation and the pressurization due to the flow of coolant about the back of the target plate.

Another problem that must be addressed during production of Tc-99m from Mo-100 is preventing Mo-100 coated onto a target plate, from oxidizing during and after irradiation with proton beams. Molydenum oxide has a significant vapor pressure at only a few hundred ° C. and consequently, exposure to high heat and oxygen during proton irradiation will result in the formation of molybdenum oxide resulting in decreases in the conversion efficiency of Mo-100 to Tc-99m.

Accordingly, some exemplary embodiments of the present disclosure relate to a system comprising: (i) components for mounting and housing Mo-100-coated target plates, these components referred to hereinafter as "target capsule assemblies" or "target capsule apparatus", and (ii) components for engaging and disengaging the target capsule assemblies with sources of proton irradiation generated by cyclotrons while maintaining an oxygen-depleted atmosphere about the Mo-100-coated target plates mounted therein. Accordingly, the system and components disclosed herein are configured to enable isolation of a Mo-100-coated target plate from exposure to oxygen during irradiation with protons, by the provision and maintenance of atmospheric environments that are substantially oxygen-free. The oxygen-free environments can be provided by application and maintenance of a vacuum during and after irradiation. Alternatively, the environments can be saturated with ultra-high purity inert gases.

The following portion of the disclosure with references to FIGS. 4-14 pertains to the use of the exemplary embodiments and aspects of the present disclosure for irradiation of Mo-100-coated target plates with protons delivered in a beamline to the target plates at an angle of less than 90°. Such beamlines are available PET cyclotrons exemplified by those manufactured by ACSI.

One aspect relates to a target capsule apparatus for mounting therein a Mo-100-coated target plate. Another aspect relates to a target capsule pickup apparatus for remote engagement of the target capsule and for conveying the capsule assembly to and engaging it with a target station apparatus. Another aspect relates to a target station apparatus comprising a vacuum chamber for engaging therein the assembled and engaged target capsule apparatus and target pickup apparatus. The target station apparatus is sealingly engagable with a source of protons from an accelerator such as those exemplified by cyclotrons.

Figure 4:
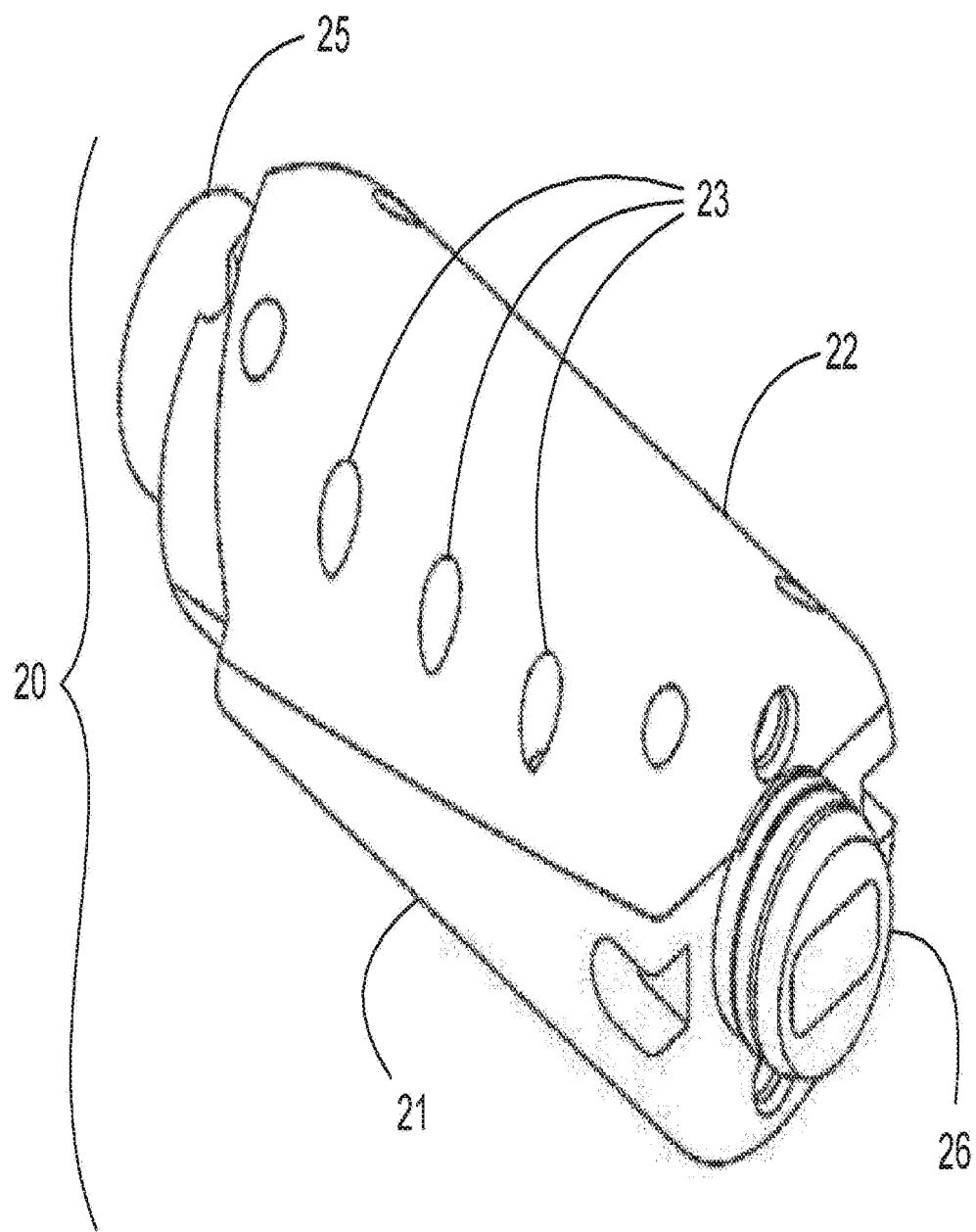
FIG. 4 is a perspective view of an exemplary target capsule apparatus for mounting therein the exemplary target plate shown in FIGS. 2, 3A, 3B.
Figure 5:
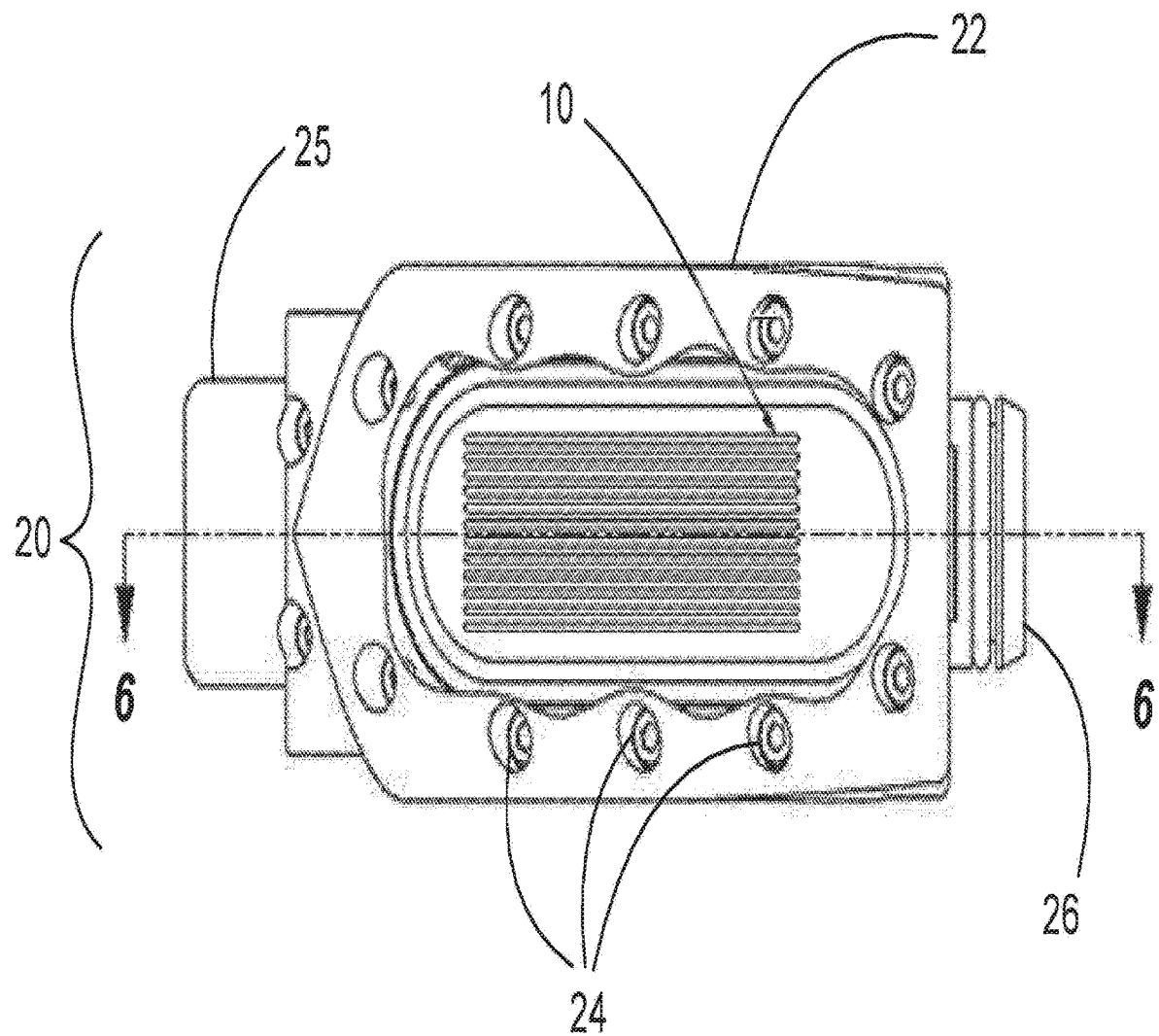
FIG. 5 is a partial view into the top of the target capsule apparatus from FIG. 4.
Figure 6:
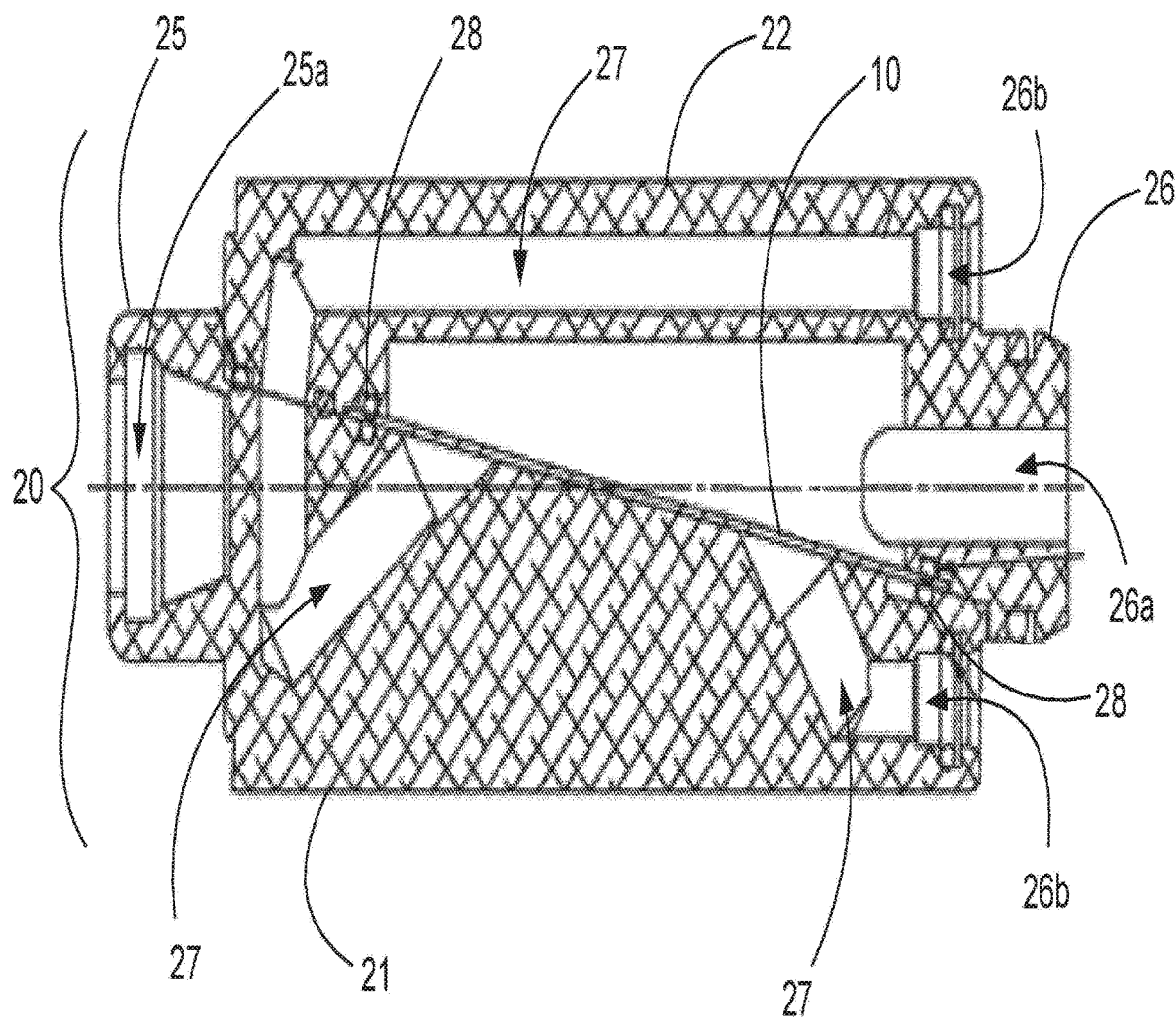
FIG. 6 is a cross-sectional side view of the target capsule apparatus from FIG. 5.

An exemplary elongate target capsule apparatus for mounting therein an elongate Mo-100-coated target plate for irradiation with protons delivered at an angle of less than 90° by PET cyclotrons exemplified by those manufactured by ASCI, is shown in FIGS. 4-6. This exemplary target capsule apparatus 20 comprises a bottom target plate holder 21 and a top cover plate 22 provided with a plurality of spaced-apart bores 23 through which socket-head cap screws 24 are inserted and threadably engaged with the bottom target plate holder 21. The elongate target capsule apparatus 20 has a proximal end 25 for engagement with a target capsule pickup apparatus, and a distal end 26 having a bore 26a for receiving an emission of protons from a suitable accelerator (not shown). The distal end 26 of the target capsule apparatus 20 also has two ports 26b for sealingly engaging a supply of a chilled coolant flow that is directed by channel 27 to contact and flow underneath target plate 10 through channels 12 provided in the undersurface of the target plate 10 (refer to FIGS. 3(a) and (b)). The upper surface of the bottom target plate holder 21 may be inclined at an angle from a range of about 5° to about 85° relative to a horizontal plane. The lower surface of the top cover plate 22 is inclined at a matching angle to the upper surface of the bottom target plate holder 21. An elongate target plate 10 is placed on top of O-rings 28 fitted into channels provided therefore in the upper surface of the bottom target plate holder 21. O-rings 28 are also fitted into channels provided therefore in the lower surface of the top cover plate 22. The O-rings 28 securely and sealingly engage the elongate target plate 10 between the bottom target plate holder 21 and the top cover plate 22 when the socket-head cap screws 24 are inserted through the spaced-apart bores 23 and are threadably engaged with the bottom target plate holder 21. The shape of the outer diameter of the proximal end (25) of the target capsule apparatus 20 is to engage with rollers (not shown) provided therefor in the target station and to rotate the target capsule apparatus 20 to align the ports 26a, 26b with the target station to form the vacuum and water seals. The symmetrical configuration of the target capsule apparatus 20 makes it possible to rotate the apparatus 20 in a clockwise direction or in a counter-clockwise direction. The coolant can ingress the target capsule apparatus 20 through either of ports 26b and egress through the opposite port 26b.

Figure 7:
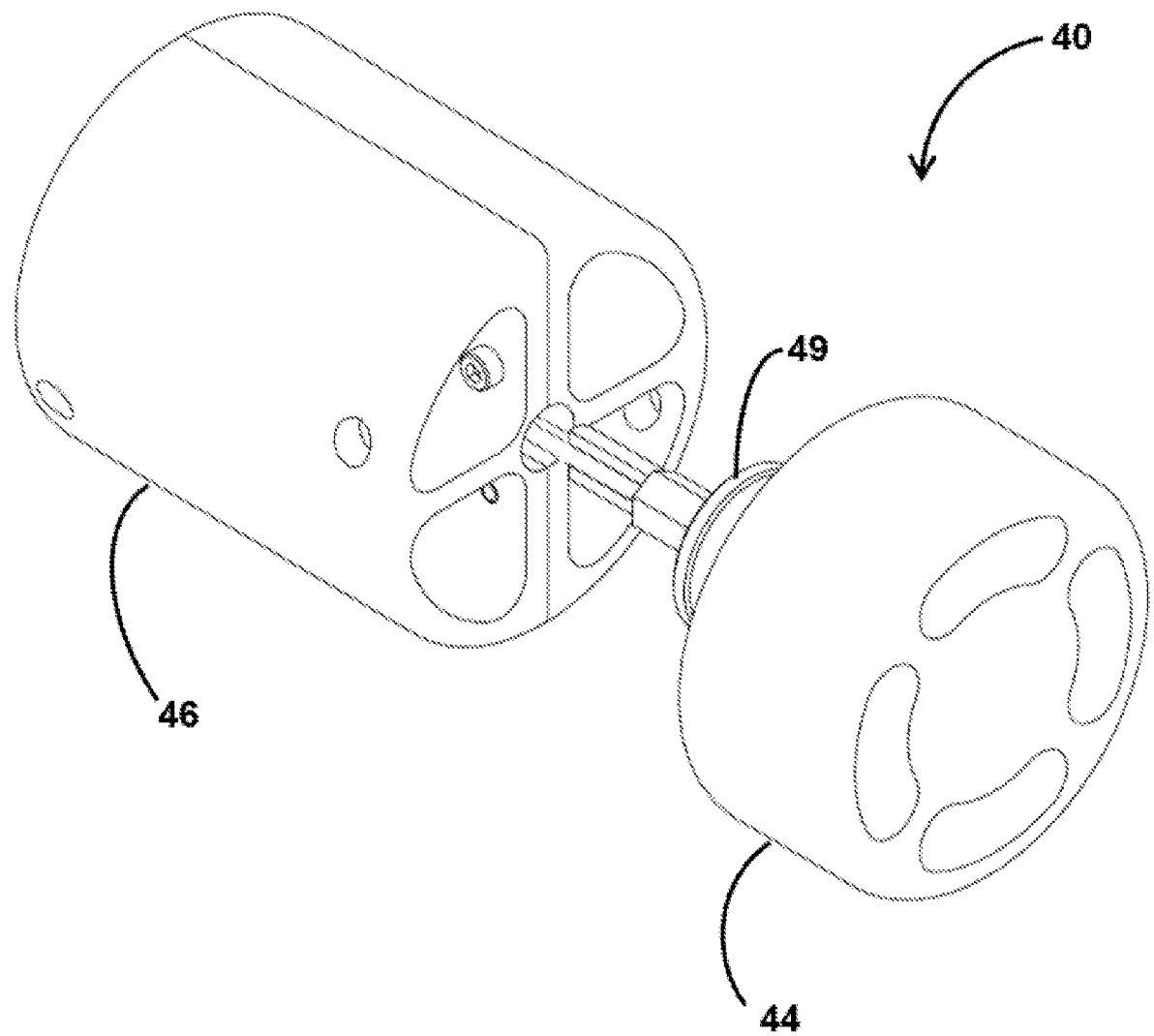
FIG. 7 is a perspective view of an exemplary target pickup apparatus with a pusher component for engaging the target capsule assembly apparatus in FIGS. 4-6.
Figure 8:
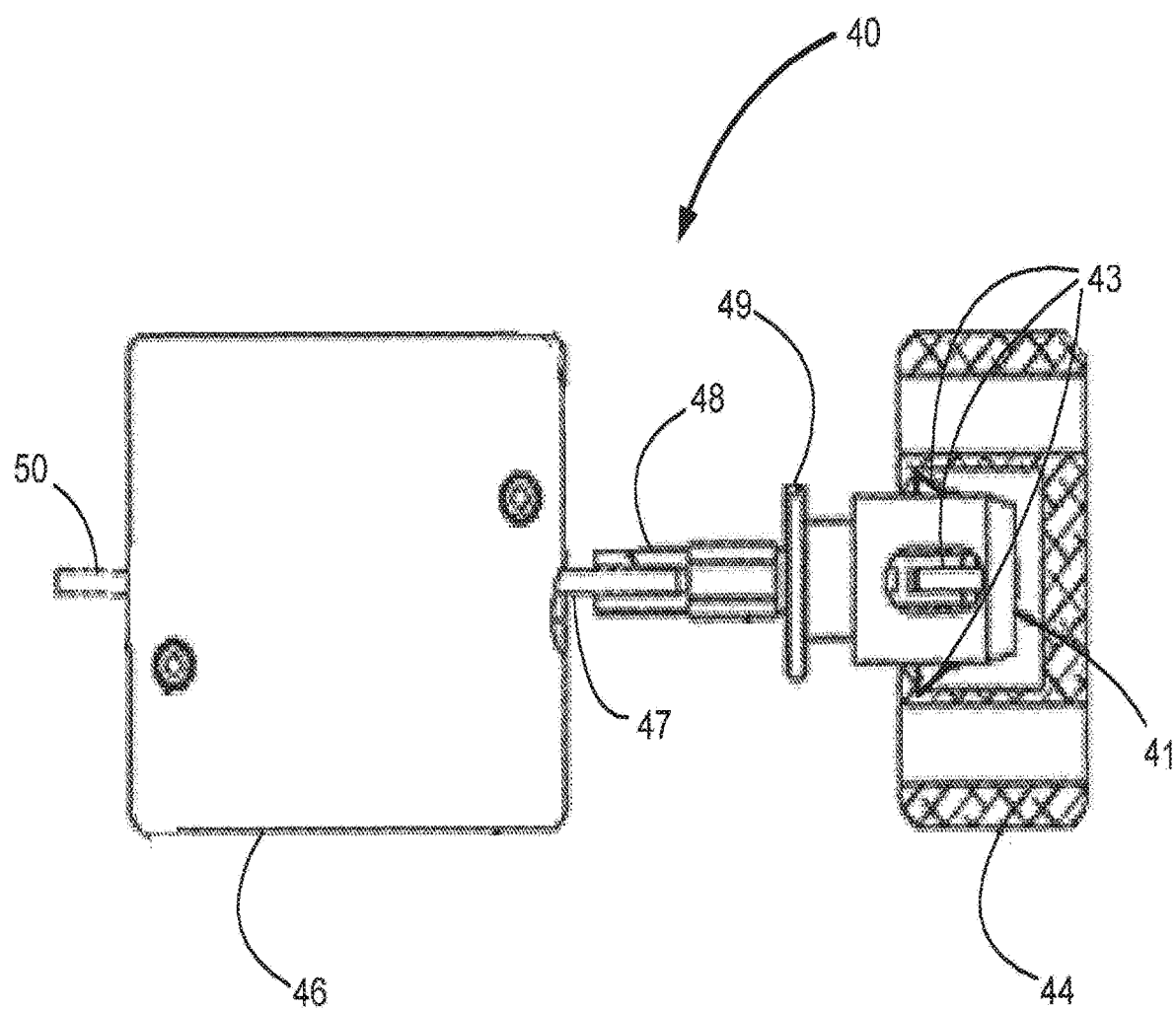
FIG. 8 is a cross-sectional side view of the target pickup apparatus from FIG. 7 engaged with the pusher component.

An exemplary target pickup apparatus 40 is shown in FIGS. 7-8. The target pickup apparatus 40 comprises a pickup head device 41 configured for engaging with and disengaging from chamber 25a provided therefor in the proximal end 25 of the target capsule apparatus 20 shown in FIGS. 4-6. The pickup head device 41 is provided with structures that radially extend and retract from within the pickup head configured to engage and disengage with the chamber 25a in the proximal end 25 of the target plate capsule apparatus 20. Suitable engagement devices are exemplified by pins, prongs, struts and the like. FIG. 8 shows extendible/retractable prongs 43. The target pickup apparatus 40 is also provided with a target capsule apparatus pusher 44 that is engagible and disengagible by the engagement devices exemplified by prongs 43. The extendible/retractable prongs 43 provided in the pickup head device 41 are actuated and manipulated by a remotely controllable pull ring 49 mounted onto a coupling shaft 48 extending backward from the pickup head device 41. The target pickup apparatus 40 additionally comprises a target pickup guide 46 provided with forward extending shaft 47 that is slidingly received and engaged with the coupling shaft 48 extending backward from the pickup head device 41. The rear of the target pickup guide 46 cooperates with an engagible/disengagible steel tape (shown as a shaft 50 in dashed lines in FIG. 8) that cooperates with the target pickup apparatus 40 for delivery of a target capsule apparatus 20 from a target station receiving cell apparatus 80 (See FIG. 9) to a target station apparatus (shown as item 58 in FIG. 12), and then for post-irradiation recovery of the target capsule assembly 20 from the target station apparatus 58 and delivery back to the target station receiving cell apparatus 80.

Figure 9:
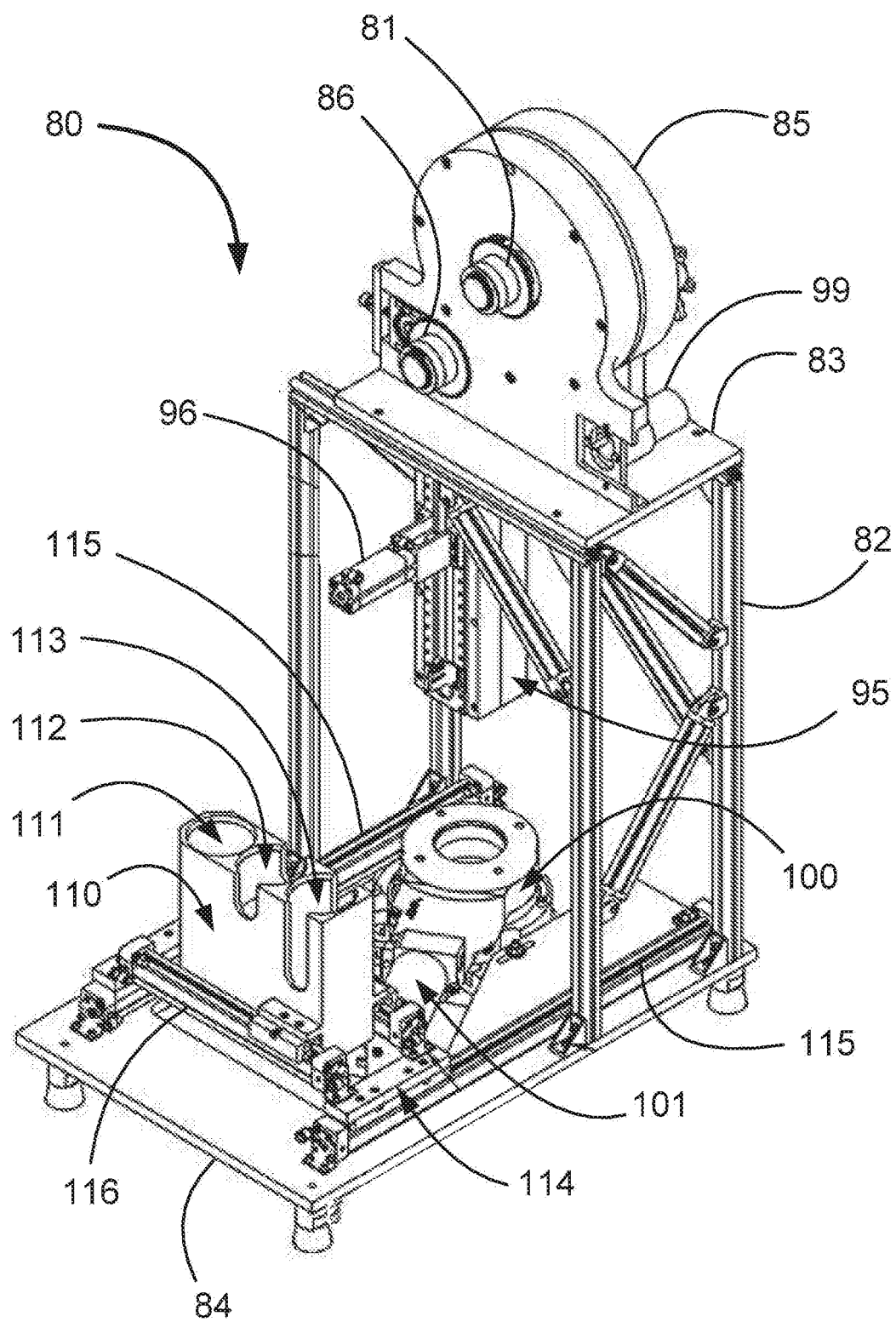
FIG. 9 is a perspective view of an exemplary receiving cell apparatus for engaging and cooperating with the target station apparatus shown in FIGS. 12-14.
Figure 10:
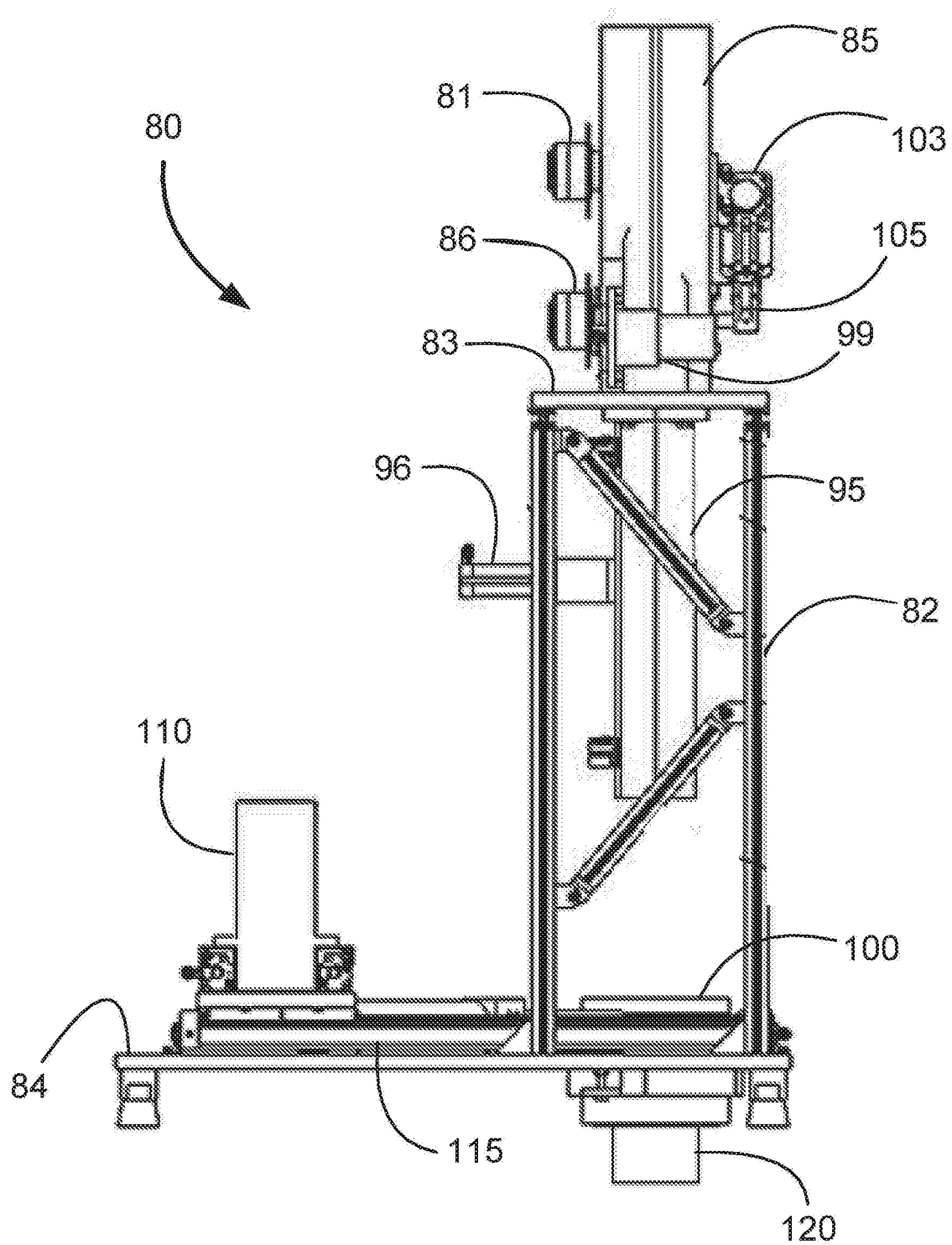
FIG. 10 is a side view of the receiving cell apparatus shown in FIG. 9.
Figure 11:
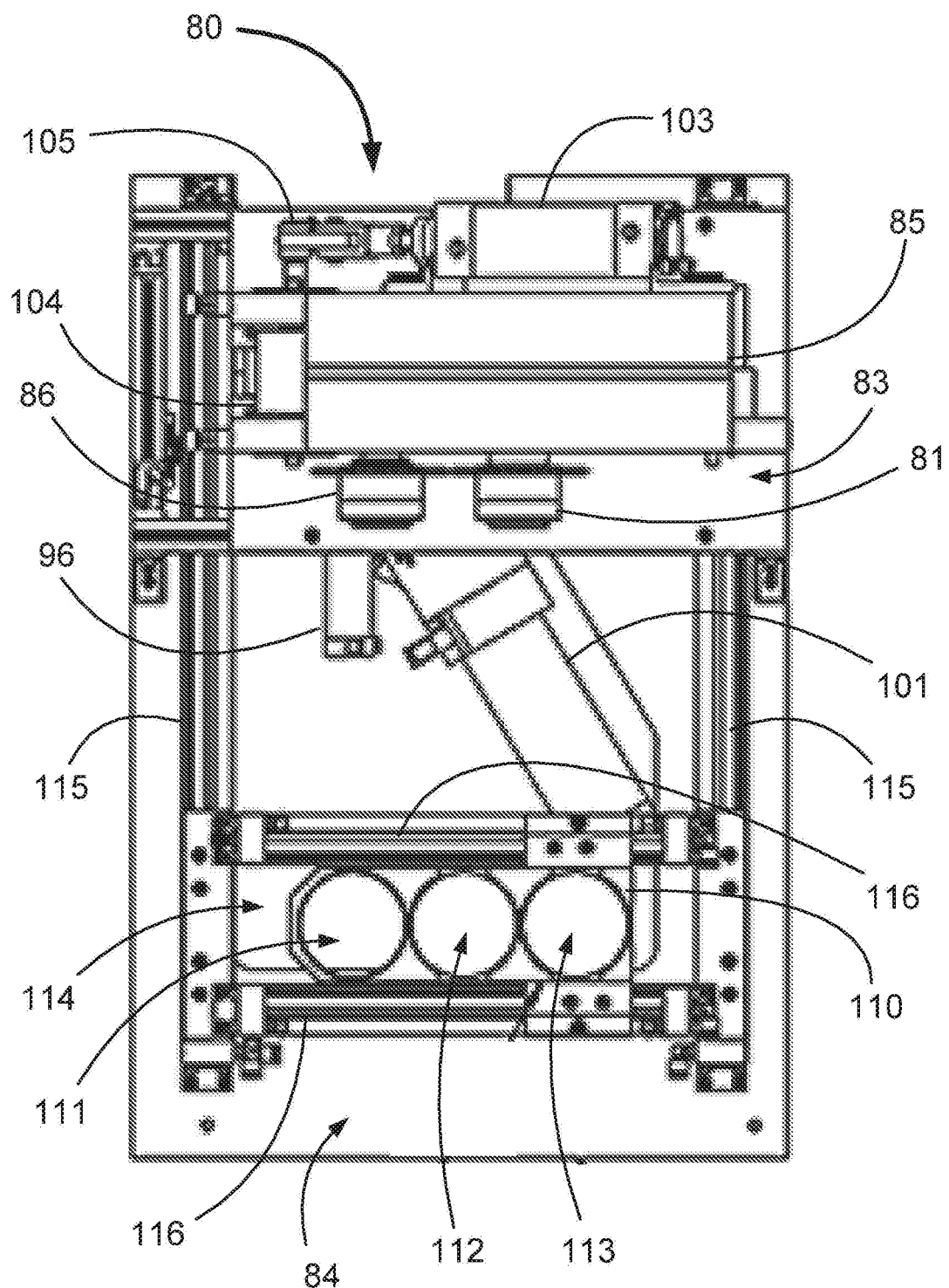
FIG. 11 is a top of the receiving cell apparatus shown in FIG. 9.

FIGS. 9-11 show an exemplary target station receiving cell apparatus 80 that is installable in a lead-lined fume hood. Suitable lead-lined fume hoods are exemplified by "hot cells" available from Von Gahlen International Inc. (Chatsworth, Ga., USA) and from Comecer Inc. (Miami, Fla., USA). The target station receiving cell apparatus 80 comprises a framework 82 onto which are mounted an upper shelf 83 and a lower shelf 84. A drive unit assembly 85 is mounted onto the upper shelf 83. The drive unit assembly 85 houses a length of steel tape 50 that is rolled up onto a drum (not shown) housed within the drive unit assembly 85. The proximal end of the steel tape 50 is engaged with a drum (not shown) provided within the drive unit assembly 85, while the distal end of the steel tape 50 is coupled with the target pickup apparatus 40 as shown in FIG. 8. The drive assembly has: (i) a first one-way clutch and gear assembly 81 that is engaged with the drum, (ii) a second one-way clutch and gear assembly 86 that is controllably engagible with the steel tape extending therethrough, and (iii) a drive motor 99 that cooperates with a chain (not shown) to provide a driving force to the first one-way clutch and gear assembly 81 and the second one-way clutch and gear assembly 86. The distal end of the steel tape is coupled to the pickup head device 41 of the target pickup apparatus 40 and extends downward within the target leading tube 95 when not in use. The target pickup apparatus 40 is deployed and recovered through a target leading tube 95 by the operation of the drive unit assembly 85. A gate valve assembly 100 is mounted onto a port in the hot cell (not shown) directly underneath the target leading tube 95. The gate valve (not shown) within gate valve assembly 100 is opened and closed by actuator 101. Mounted onto the lower shelf 84 are carriage rails 115 on which is conveyed backward and forward a docking station carriage table 114. A docking station 110 is mounted onto the docking station carriage table 114. The docking station 110 is moveable sideways by a pair of linear actuators 116. The docking station comprises a housing having three linearly aligned bores 111, 112, 113. Bore 111 is a through hole for connecting the lower end of target leading tube 95 with the top of the gate valve assembly 100. Bore 112 is provided to receive and store the target capsule apparatus pusher 44 component of the target pickup apparatus 40, when it is not in use. Bore 113 is provided to receive an assembled target capsule assembly 20 with its proximal end 25 in an upward position.

In use, within a hot cell using remote-controlled devices (not shown), a Mo-100-coated target plate 10 is mounted into a target capsule assembly 20. The loaded target capsule assembly 20 is placed by the remote-controlled devices into the target capsule assembly receiving bore 113 while the target docking station carriage table 114 is positioned by remote control forward and clear of upper shelf 83. Target docking station carriage table 114 is then driven by remote control to a position under upper shelf 83 such that the linearly aligned bores 111, 112, 113 are centrally aligned with the gate valve assembly 100. The docking station 110 is then conveyed sideways to precisely position bore 113 underneath the target leading tube 95 thus being simultaneously directed above gate valve assembly 100. The transfer drive unit assembly 85 is then operated to deploy sufficient steel tape to engage the target pickup mechanism 41 with the target capsule apparatus 20, and then, the transfer drive unit assembly 85 is reversed to draw the target capsule apparatus 20 up into target leading tube 95. Them the docking station 110 is moved to align bore 111 with the target leading tube 95 thus being simultaneously positioned directly above gate valve assembly 100, after which, actuator 101 is operated to open the gate valve. Release actuator 96 is operated to release the target capsule 20 from the target pickup mechanism 41 allowing the target capsule 20 to fall through the bore of gate valve assembly 100 and into transfer tube 68. Then, docking station 110 is moved so that target capsule pusher receiving bore 112 is directly under the target leading tube 95. The transfer drive 85 is operated to engage the target capsule apparatus pusher 44 by deploying steel tape from the drum within the transfer drive 85 by the pinch rollers 104 in cooperation the pinch roller linear actuator 103, the pinch roller cam linkage 105, and the second one-way clutch and gear assembly 86, so that prongs 43 in the pickup head device 41 of the target pickup apparatus 40 engage the target capsule apparatus pusher 44. The first one-way clutch and gear assembly 81 is disengaged and operates freely when the second one-way clutch and gear assembly is engaged. The target pickup apparatus 40 engaged with the pusher 44 is then drawn up into target leading tube 95 by disengaging the pinch rollers 104 by operating the pinch roller linear actuator 103 in cooperation with pinch roller cam linkage 15, and then re-winding the steel tape onto the drum of the transfer drive apparatus 85 with the first one-way clutch and gear assembly 81 in cooperation with the drive motor 99. The second one-way clutch and gear assembly 86 is disengaged and operating freely during this operation. The docking station 110 is then moved so that bore 111 is directly under the target leading tube 95. The transfer drive apparatus 85 is then operated to deploy the steel tape by the pinch rollers 104 in cooperation with the pinch roller linear actuator 103 and the second one-way clutch 86 (first one-way clutch and gear assembly 81 is disengaged and operates freely) so that the target pickup apparatus 40 with the pusher 44 pushes the target capsule assembly 20 through the transfer tube 68 to deliver the target capsule assembly 20 to a target station assembly (shown as 58 in FIGS. 12-14) that is operably coupled to a cyclotron.

Figure 12:
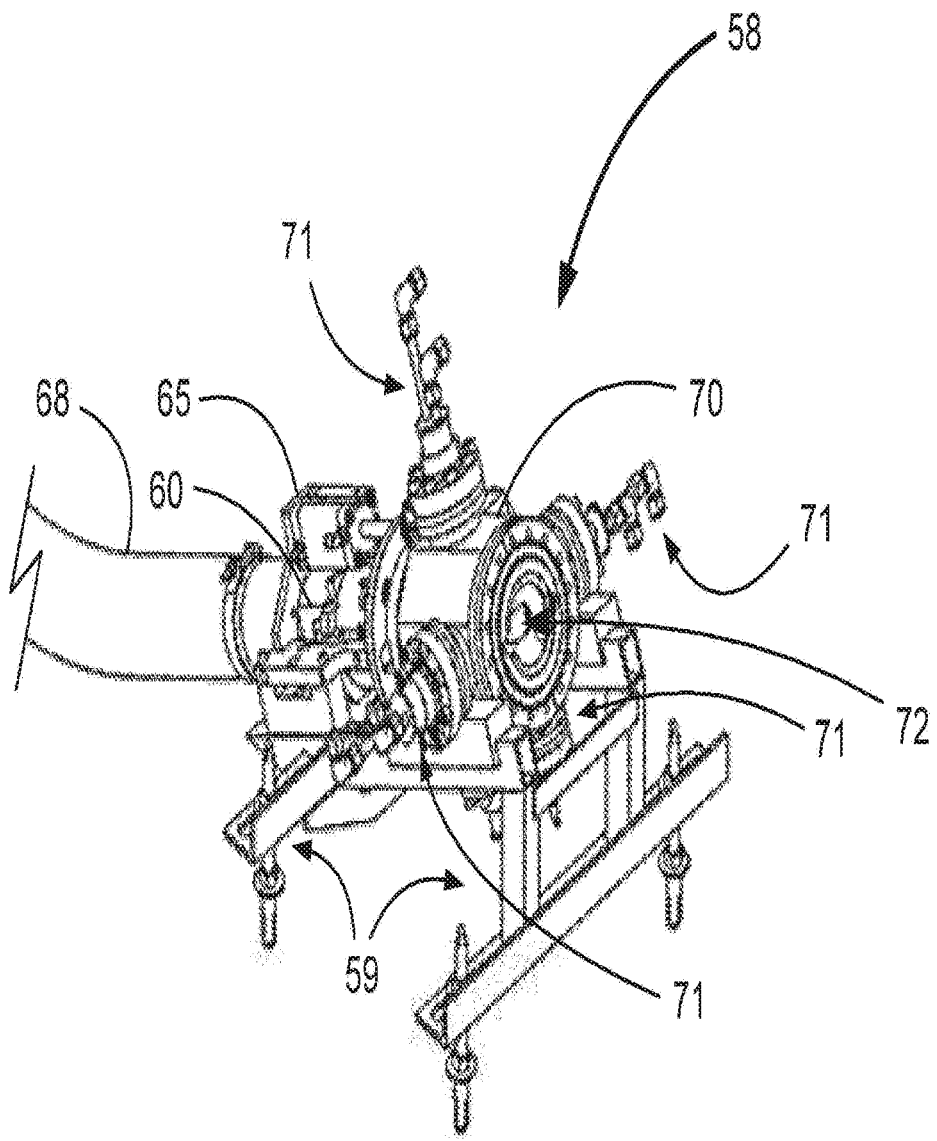
FIG. 12 is a perspective view of an exemplary target station apparatus for receiving the target pickup apparatus shown in FIGS. 7-8 engaged with the target capsule apparatus shown in FIGS. 4-6.
Figure 13:
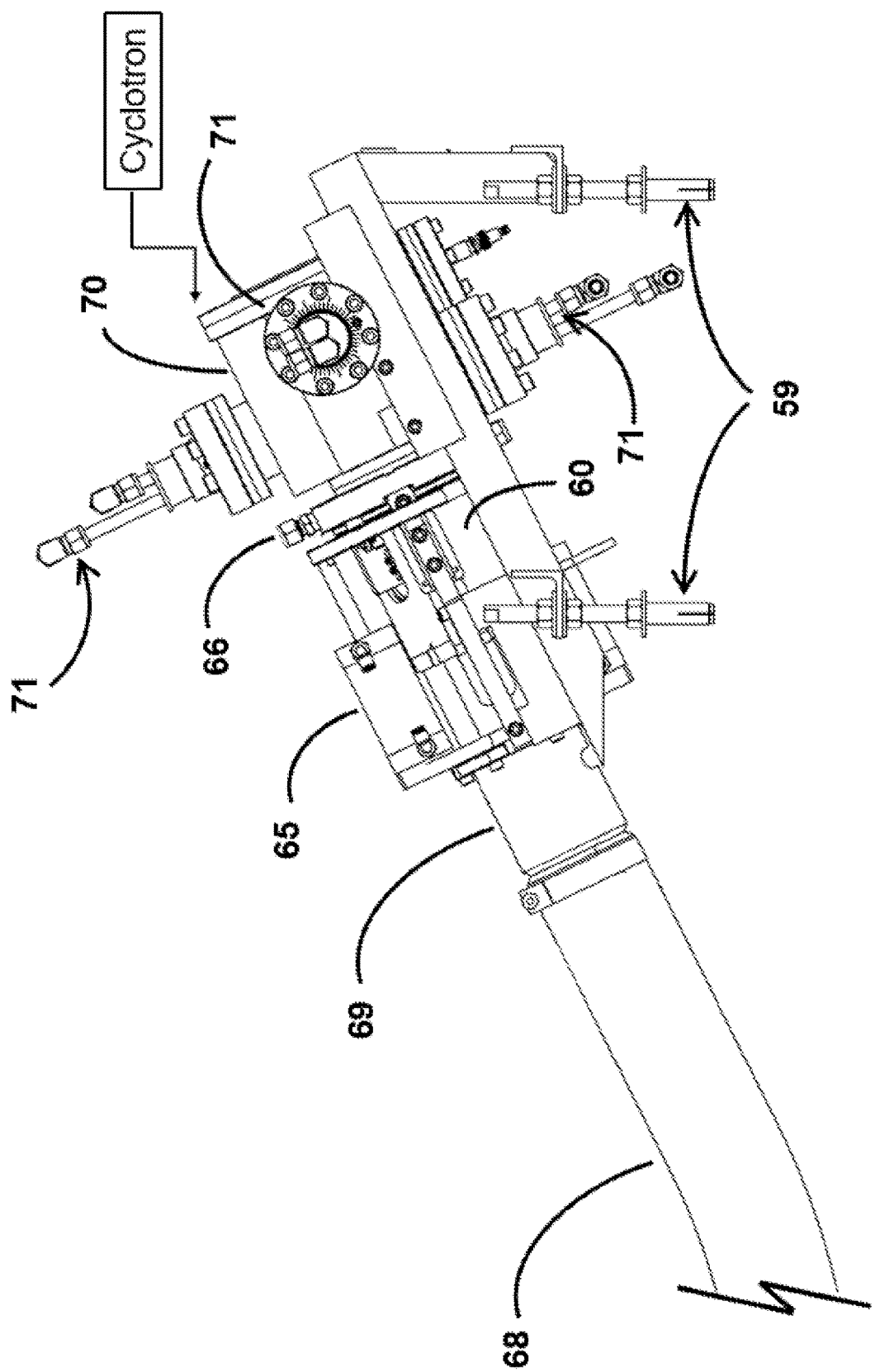
FIG. 13 is a side view of the target station apparatus shown in FIG. 12.
Figure 14:
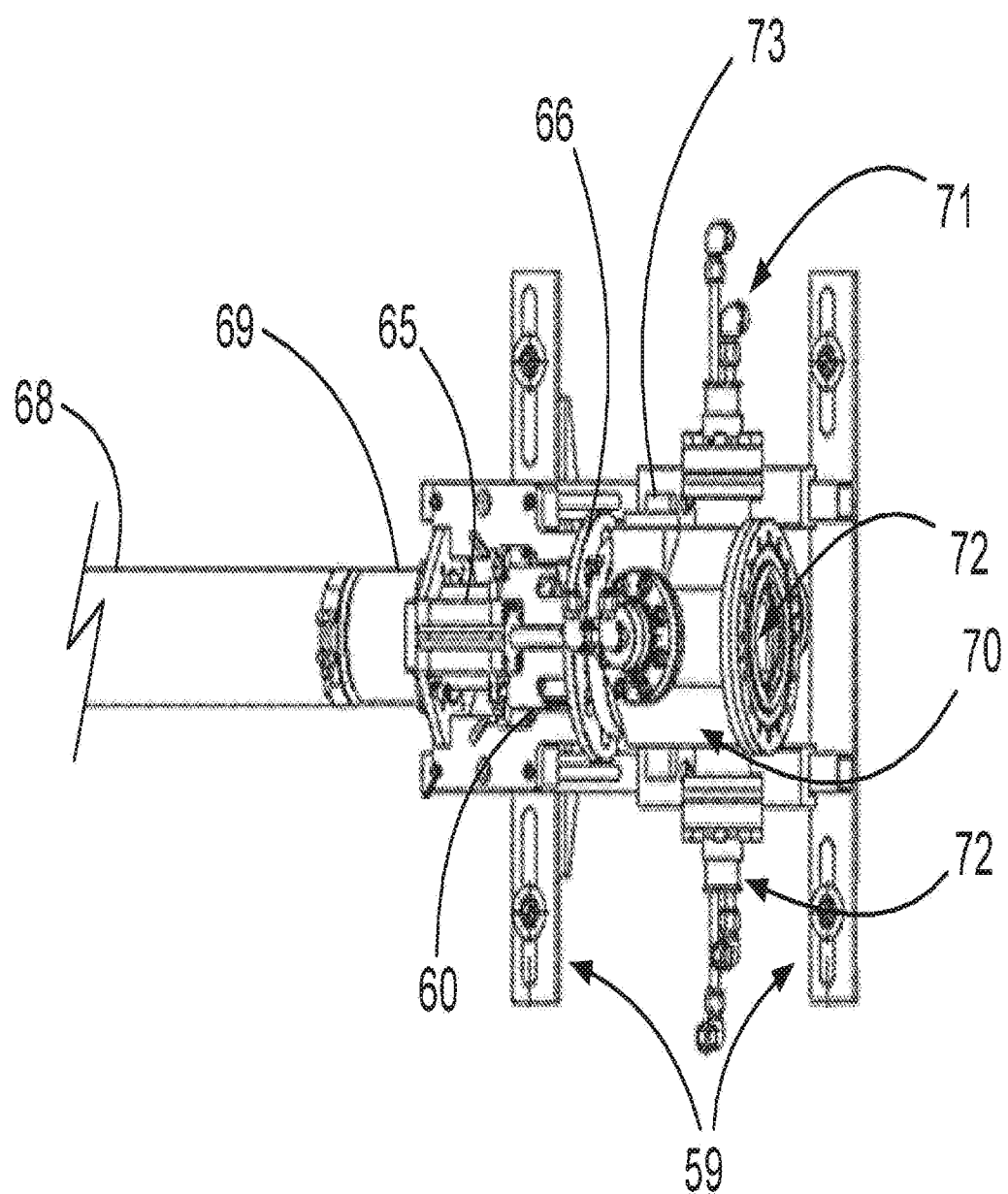
FIG. 14 is a top view of the target station apparatus shown in FIG. 12.

FIGS. 12-14 show an assembly 58 of an exemplary target station apparatus 60 coupled by a spigot flange 66 to a vacuum chamber apparatus 70 that is engaged with a beam line to an accelerator such as a cyclotron (not shown). The assembly is mounted into the facility by framework 59. The target station apparatus 60 is connected to a transfer tube 68 by a transfer tube mount 69. The other end of the transfer tube 68 is engaged with the flange 120 of the gate valve assembly 100 mounted into the receiving cell apparatus 80 shown in FIGS. 9-11. The target station apparatus 60 comprises a housing wherein is delivered the elongate target capsule apparatus 20 (shown in FIGS. 4-6) by the target pickup apparatus 40 shown in FIGS. 7-8. A linear drive unit 65 mounted onto the target station apparatus 60 engages two rollers (not shown) that contact the outer diameter of the proximal end of target capsule assembly 20 and cooperate with the curved surface of the outer diameter to rotate the target capsule apparatus 20 so that it is aligned with spigot flange 66. After it is aligned, the target capsule apparatus 20 is then moved by the linear drive unit 65 to sealably engage spigot flange 66 thereby forming a vacuum-tight connection between target capsule port 26a with the vacuum chamber apparatus 70 and two water-tight connections with target capsule ports 26b. Target capsule assembly 20 may engage with spigot flange 66 in either of two positions 180 degrees apart because both positions are operationally identical. The loaded target capsule assembly 20 is now ready for proton irradiation. The vacuum chamber 70 is evacuated by suitable vacuum pumps (not shown) interconnected to a vacuum port 73. The proton beam is collimated during the irradiation process by four proton beam collimator assemblies 71 mounted about the vacuum chamber 70. The passage of the proton beam is limited in position by baffle 72 such that the protons are only incident on the collimators or target plate 10 of target capsule assembly 20.

After proton irradiation is complete, the beamline is isolated from the vacuum chamber 70 with the aforementioned vacuum valve and the vacuum chamber pressure is raised to atmospheric pressure. The cooling water is purged out of the target capsule 20. The irradiated target capsule assembly 20 is disengaged from spigot flange 66 by linear actuator 65 and then recovered by engaging the pickup head device 41 of target pickup apparatus 40 with the chamber 25a in the proximal end of the target capsule assembly 20. The target capsule assembly 20 is then delivered back to the target station receiving cell apparatus 80 by recovery of the deployed steel tape 50 by the drive unit assembly 85 until the target capsule unit egresses from the transfer tube 68 and out of the gate valve assembly 100. The docking station 110 is then conveyed to position precisely bore 113 underneath the target leading tube 95, after which the irradiated target capsule assembly 20 is deposited into the target capsule assembly receiving bore 113 and disengaged from the target pickup apparatus 40. The target pickup apparatus 40 is then retracted into the target leading tube 95, and the docking station 110 moved back to its resting position. As will be described in more detail later, the pertechnetate ions and molybdenate ions are dissolved from the irradiated target plate in an apparatus provided therefore in the hot cell, recovered and then separately purified.

Another embodiment of the present disclosure pertains to systems comprising components for mounting and housing circular Mo-100-coated target plates, and components for engaging and disengaging the housed circular target plates with sources of proton irradiation generated by cyclotrons while maintaining an oxygen-depleted atmosphere about the mounted Mo-100-coated target plates.

An exemplary circular target plate 140 is shown in FIGS. 15A-15C. FIG. 15A is a perspective view from the top of the circular target plate 140 and shows a recessed section 145 about the centre of the circular target plate 140. FIG. 15B is a top view of the circular target plate 140, while FIG. 15C is a cross-sectional side view of the circular target plate 140. The circular target plate 140 may comprise any transition metal such as those exemplified by copper, cobalt, iron, nickel, palladium, rhodium, silver, tantalum, tungsten, zinc, and their alloys. Particularly suitable are copper, silver, rhodium, tantalum, and zinc. The recessed portion 145 is provided for receiving therein a refined Mo-100 metal powder, which is then sintered as previously described.

Figure 16:
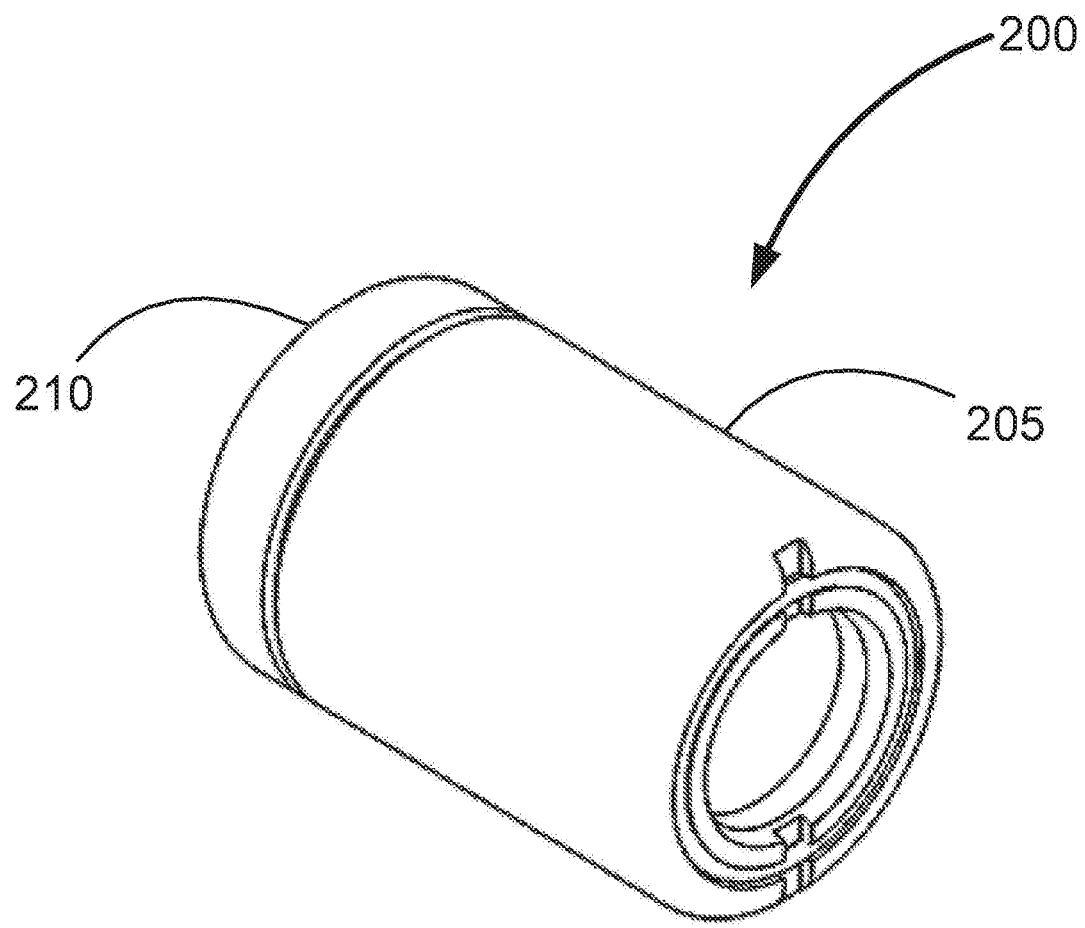
FIG. 16 is a perspective view of an exemplary target capsule apparatus for mounting therein a circular target disc.
Figure 17:
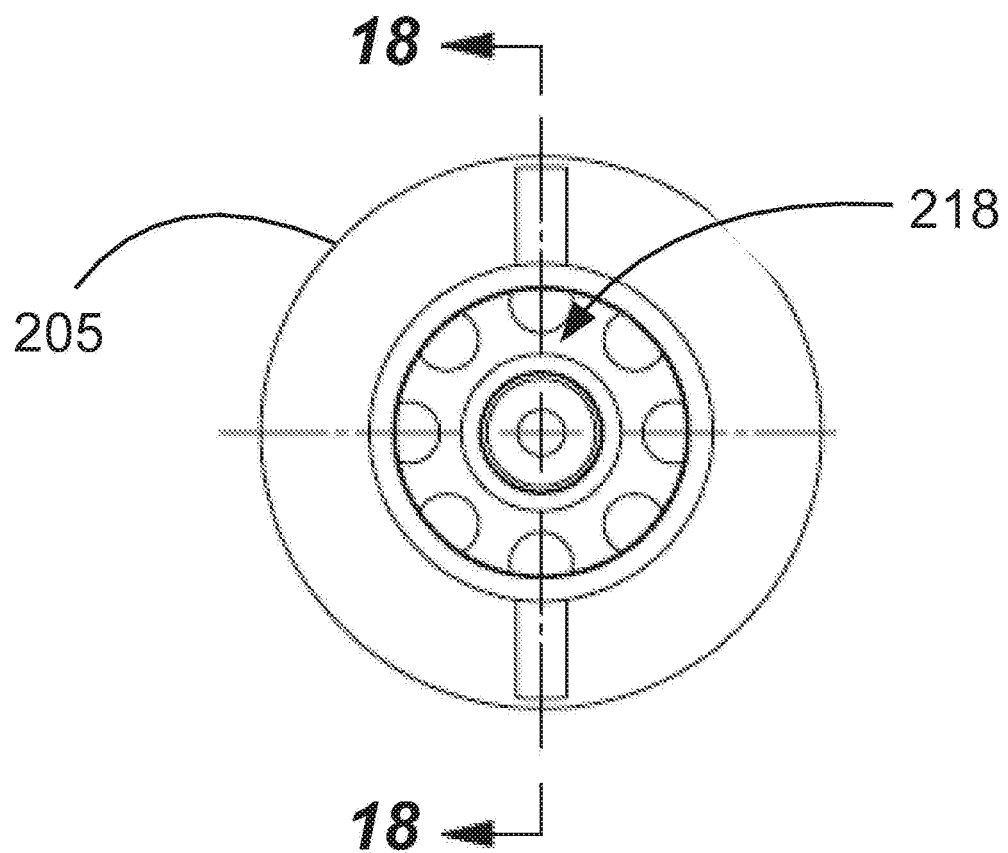
FIG. 17 is an end view of the target capsule apparatus shown in FIG. 16.
Figure 18:
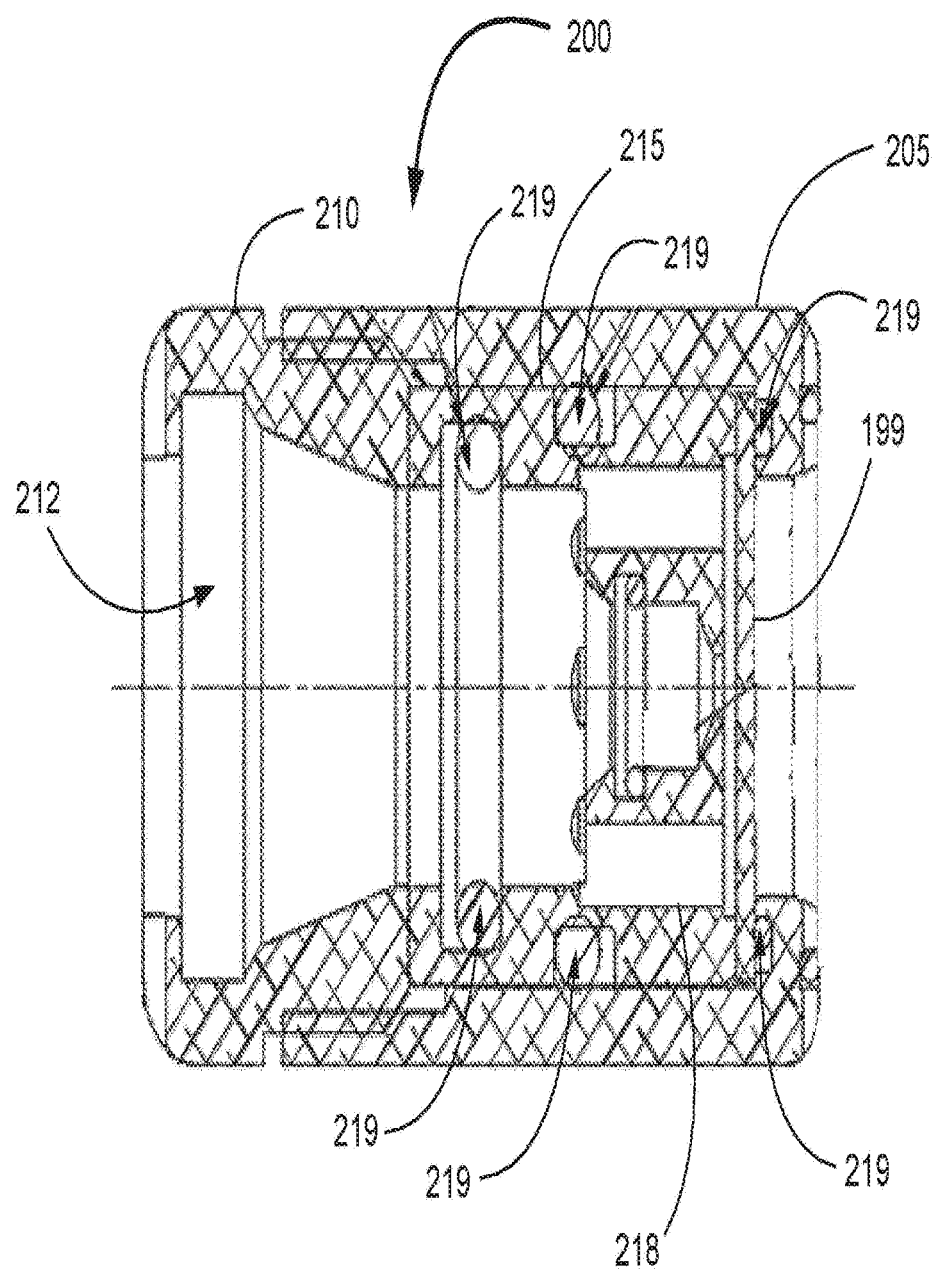
FIG. 18 is a cross-sectional side view of the target capsule apparatus shown in FIG. 16.

FIGS. 16-18 show an exemplary capsule apparatus 200 for positioning and mounting, therein a Mo-100-coated circular target plate 199 that does not have a recess, or alternatively, a circular target plate with a recess as exemplified in FIGS. 15A-15C. FIG. 16 is a perspective view, FIG. 17 is an end view with target plate 140 removed, and FIG. 17 is a cross-sectional side view of the capsule apparatus 200 that generally comprises an outer housing 205, an inner cooling distributor 215 (also referred to as a cooling sleeve) for receiving and retaining therein the Mo-100-coated circular target plate 199, and housing clamping nut 210 for securely engaging the cooling sleeve and circular target plate 140. O-rings 219 are inserted interposed the target plate 199, the outer housing 205, the inner cooling distributor 215, and the housing clamping nut 210 to sealably secure the target plate 199 into the capsule apparatus 200. The purpose of the cooling sleeve 215 is to controllably dissipate heat that is generated by proton irradiation of the Mo-100-coated target plate 140 thereby minimizing the potential for heat-generated oxidation of molybdenum atoms and technetium atoms. The capsule housing clamping nut 210 comprises a chamber 212 configured for engaging and releasing a target pickup apparatus (shown as item 220 in FIG. 19).

Figure 19:
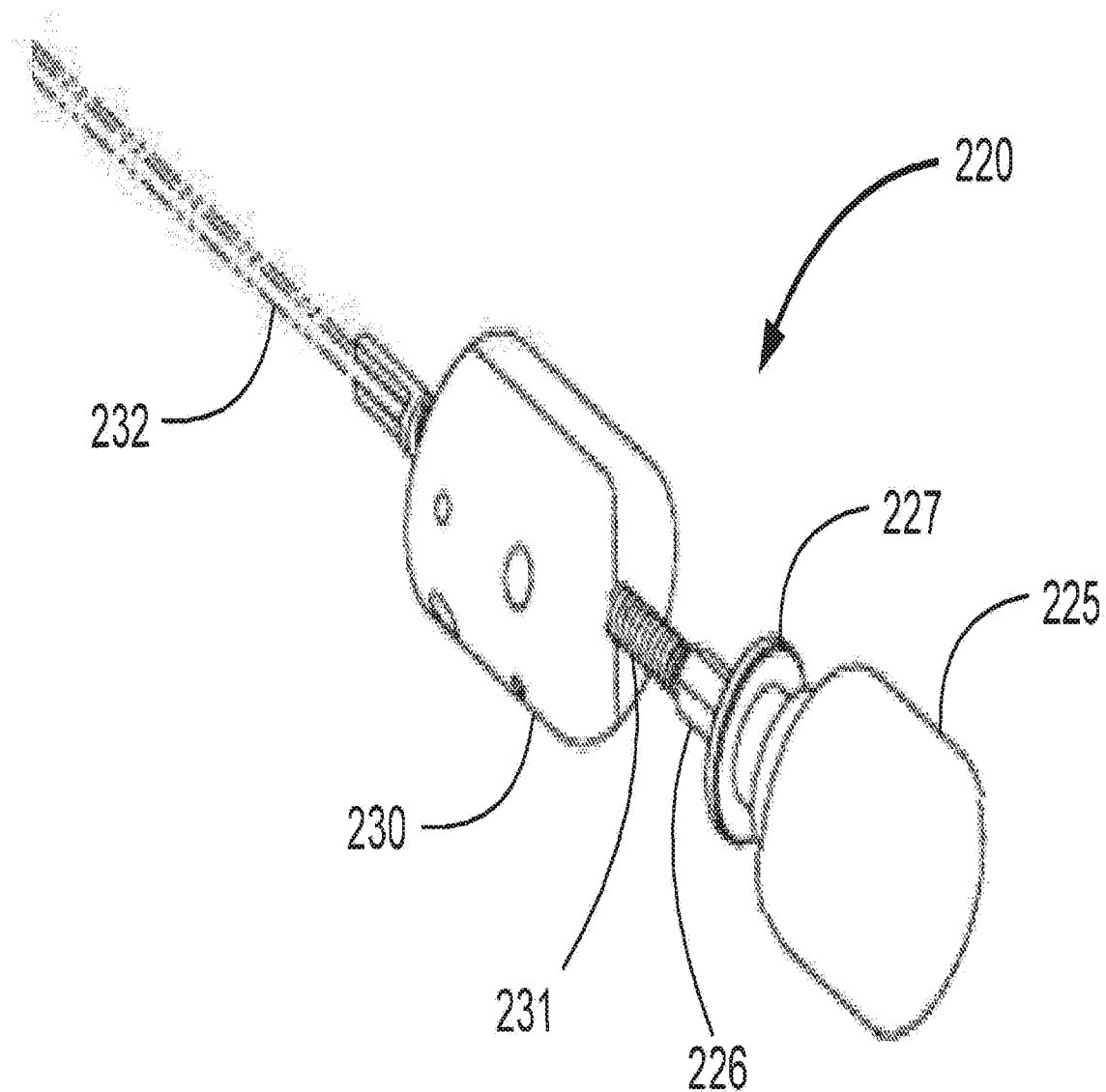
FIG. 19 is a perspective view of an exemplary target pickup apparatus engaged with a pusher component.
Figure 20:
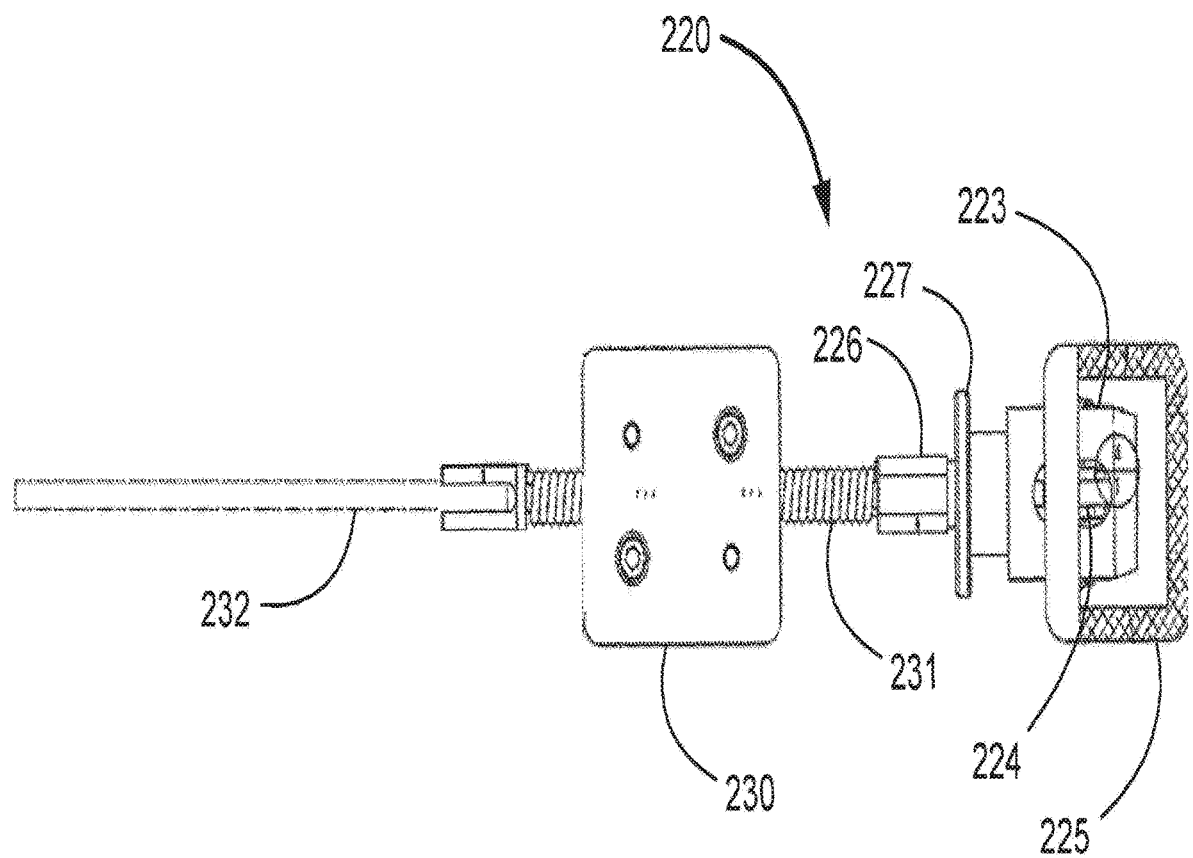
FIG. 20 is a cross-sectional side view of the target pickup apparatus from FIG. 19.
Figure 21:
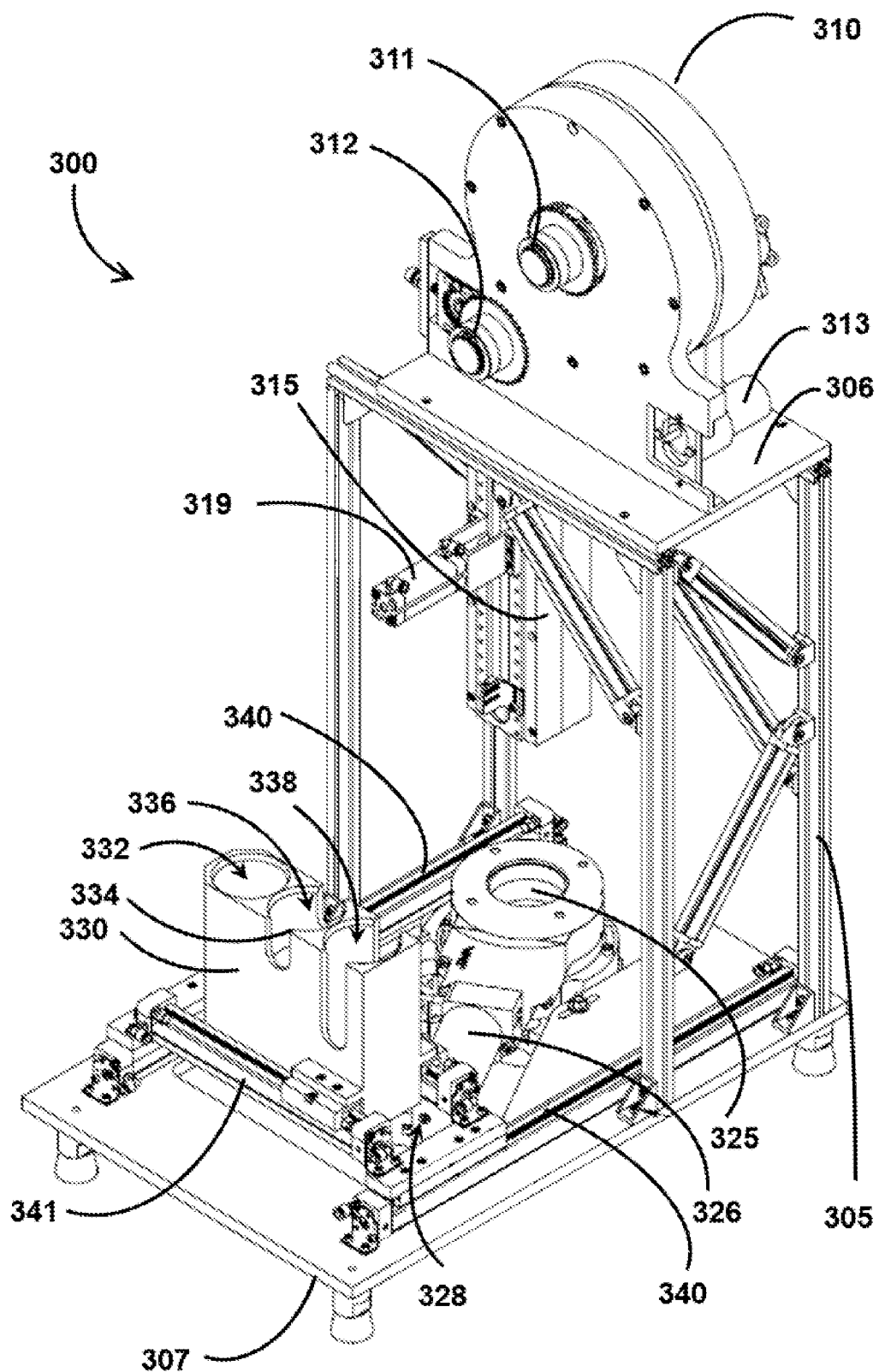
FIG. 21 is a perspective view of an exemplary receiving cell apparatus for engaging and cooperating with the target station apparatus shown in FIGS. 24-27.
Figure 22:
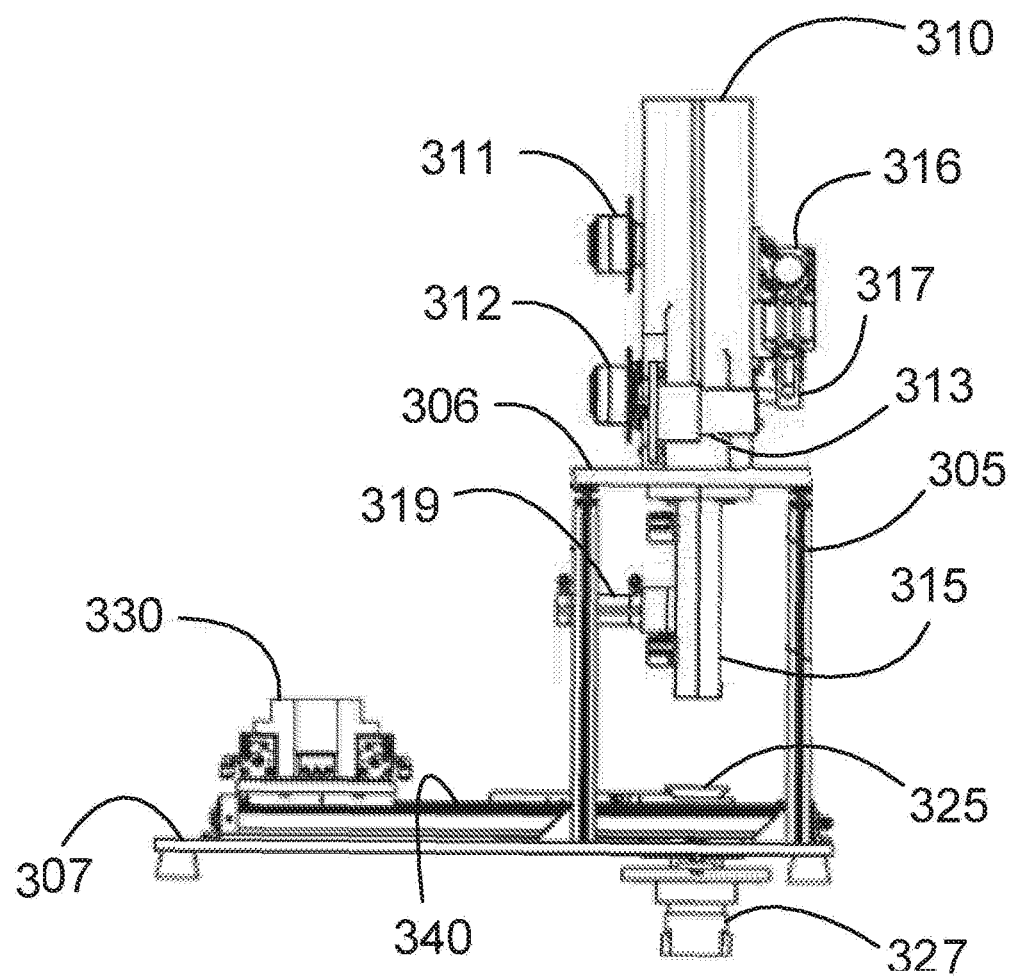
FIG. 22 is a side view of the receiving cell apparatus shown in FIG. 21.
Figure 23:
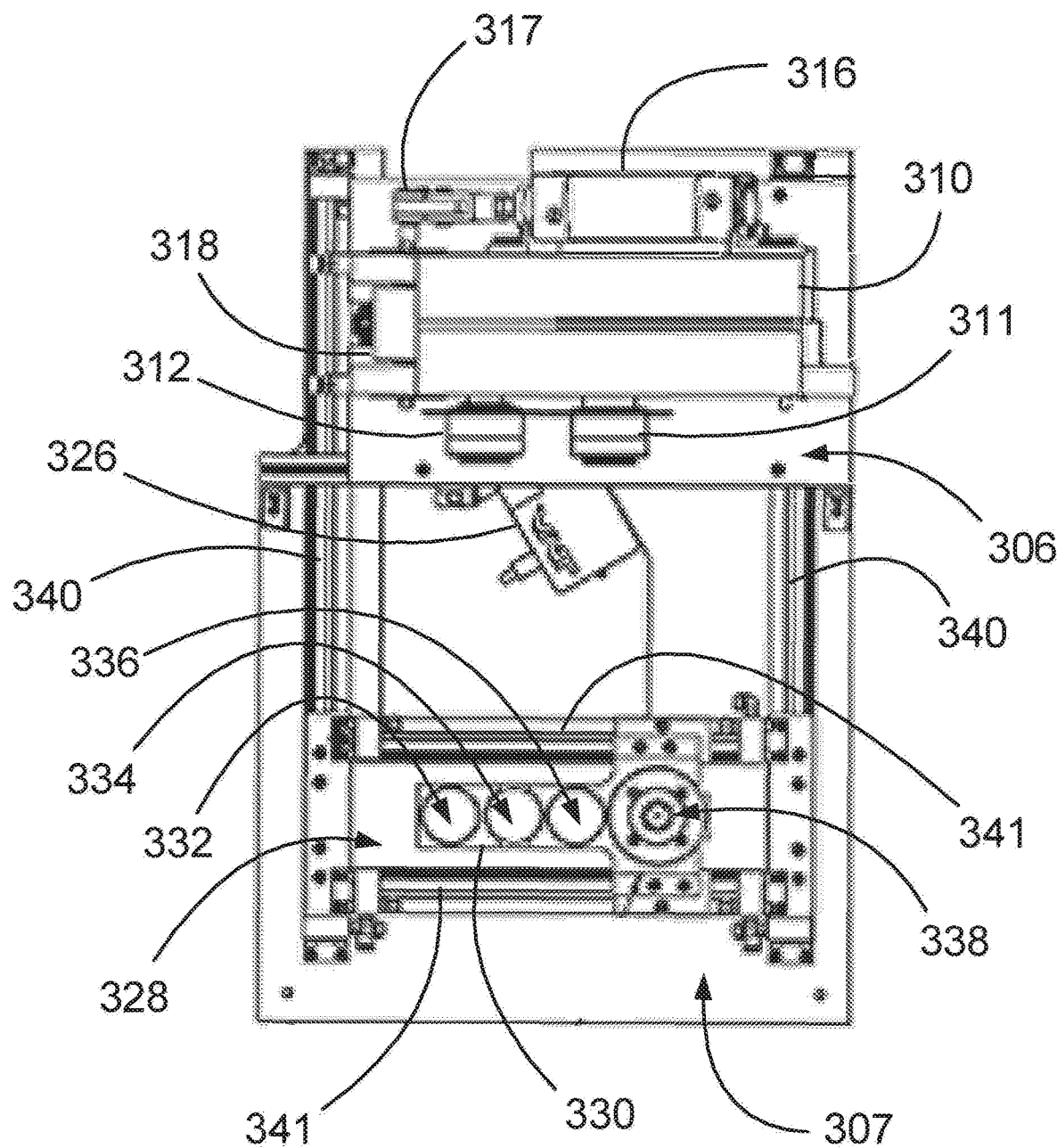
FIG. 23 is a top view of the receiving cell apparatus shown in FIG. 21.

Another aspect of this embodiment pertains to an exemplary target capsule pickup apparatus 220 for engaging and manipulating an assembled circular target plate capsule apparatus (FIGS. 19-20). FIG. 19 is a perspective view while FIG. 20 is a cross-sectional side view of the target capsule pickup apparatus 220 engaged with a pusher 225. The target capsule pickup apparatus 220 generally comprises a radially extendible/retractable pickup head device 223 for engaging an assembled target plate capsule apparatus 200 or pusher 225, shaft 226 extending backward from the pickup head for engaging a shaft 231 extending forward from a target pickup guide 230. Shaft 231 extends backward through a target pickup guide 230 and engages a steel tape 232. The target capsule pickup apparatus 220 additionally comprises a target housing pusher 225 for delivering the target capsule apparatus 200 into a target station apparatus (shown in FIGS. 24-27). The shaft 226 extending backward from the pickup head device 223 is provided with an actuating device 227 to radially extend and retract engagement devices 224 within the pickup head device 223 that are configured to engage and disengage with the assembled target plate housing apparatus. Suitable engagement devices are exemplified by pins, prongs, struts and remotely actuated and manipulated by remote control of actuating device 227.

Another aspect of this embodiment pertains to an exemplary target station apparatus for receiving and mounting therein an assembled circular target plate capsule apparatus, and then engaging the circular target plate capsule apparatus with a proton beam port on a cyclotron exemplified by GE®'s PETtrace® cyclotron systems. The target station assembly has multiple purposes, i.e., (i) receiving and mounting the assembled target plate capsule apparatus into a vacuum chamber, (ii) establishing a stable oxygen-free environment within vacuum chamber by application of a vacuum and/or replacement of the atmospheric air with an ultra-high purity inert gas exemplified by helium, (iii) delivering the assembled target plate capsule apparatus to a source of cyclotron generated proton energy and engaging the target plate capsule apparatus with the source of proton emission, (iv) establishing and maintaining a vacuum seal between the target plate capsule apparatus and the source of proton emission, (v) precisely manipulating the temperature of the cooling distributor it the housing apparatus during the irradiation operation, (vi) disengaging and removing the irradiated target plate capsule apparatus from the source of proton emission.

Figure 24:
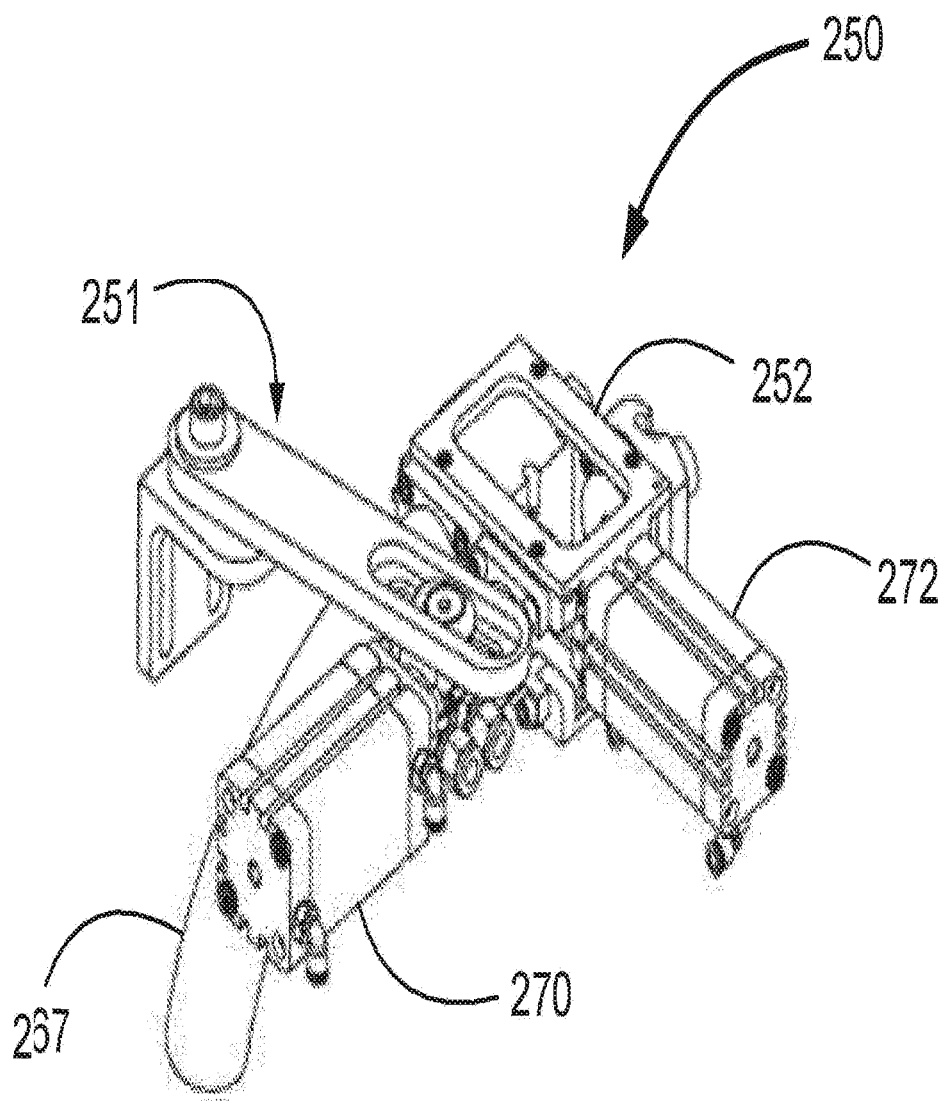
FIG. 24 is a perspective view of an exemplary target station apparatus for receiving the target pickup apparatus shown in FIG. 19 engaged with the target capsule apparatus shown in FIG. 16-18.
Figure 25:
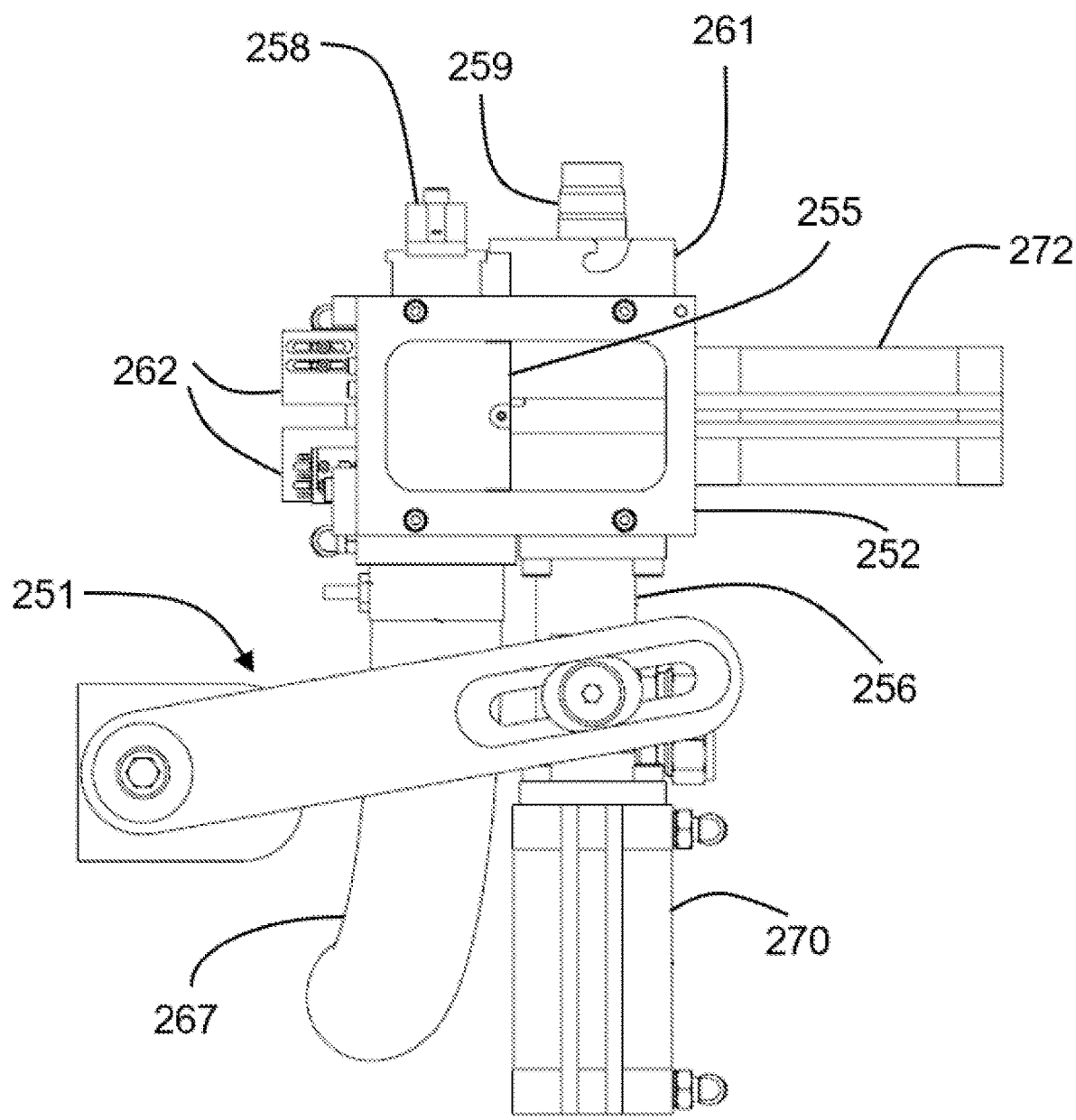
FIG. 25 is a top view of the target station apparatus shown in FIG. 24.
Figure 26:
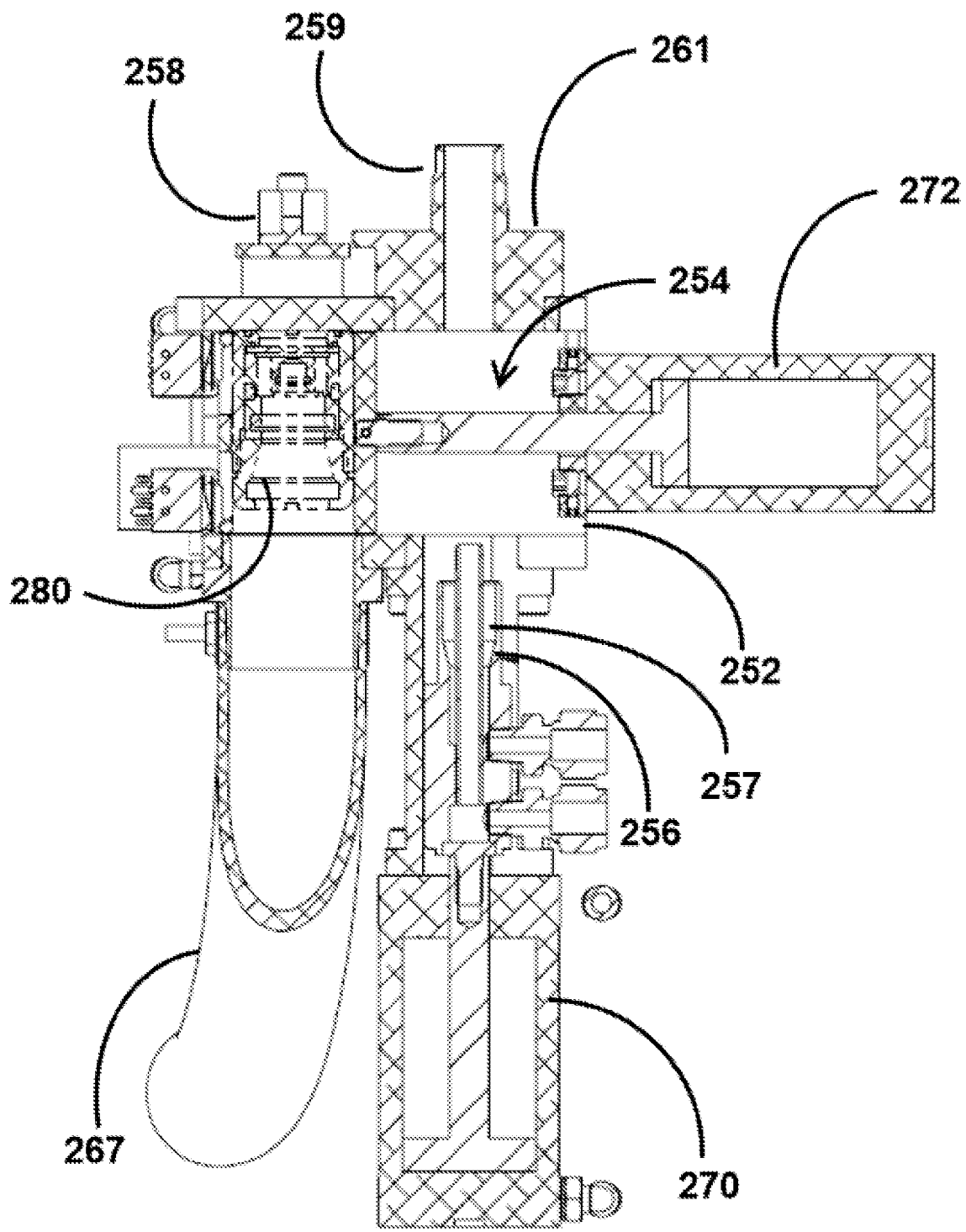
FIG. 26 is a cross-sectional top view of the target station apparatus shown in FIG. 24 with an exemplary target cell apparatus delivered to the target housing in an unloaded position.

FIGS. 21-24 show another exemplary target station receiving cell apparatus 300 that is installable in a lead-lined fume hood (also referred to as a hot cell). The receiving cell apparatus 300 comprises a framework 305 onto which are mounted an upper shelf 306 and a lower shelf 307. A drive unit assembly 310 is mounted onto the upper shelf 306. The drive unit assembly 310 houses a length of steel tape 232 rolled up onto a drum (not shown) that is housed within the drive unit assembly 310. The steel tape 232 is deployed and recovered through a target leading tube 315 that is interconnected to the drive unit assembly 310 and extends downward through the upper shelf 306. The proximal end of the steel tape (232 shown in FIGS. 19-20) is engaged with the drum housed within the drive unit assembly 310, while the distal end of the steel tape 232 is coupled with the target pickup apparatus 220 as shown in FIGS. 19-20. The drive assembly 310 has: (i) a first one-way clutch and gear assembly 311 that is engaged with the drum, (ii) a second one-way clutch and gear assembly 312 that is controllably engagible with the steel tape extending therethrough, and (iii) a drive motor 313 that cooperates with a chain not shown) to provide a driving force to the first one-way clutch and gear assembly 311 and the second one-way clutch and gear assembly 312. Accordingly, the pickup head device 223 of the target pickup apparatus 220 extends downward with the target leading tube 315 when not in use. A gate valve assembly 325 is mounted onto a port hot cell directly underneath the target leading tube 315. The gate valve assembly 325 has a flange 327 for engaging a transfer tube (shown as item 267 in FIG. 24) that is operably interconnected with a target station 250 (FIG. 24). The gate valve (not shown) within gate valve assembly 325 is opened and closed by an actuator 326. Mounted onto the lower shelf 307 are carriage rails 340 on which is conveyed backward and forward a docking station carriage table 328. A docking station 330 is mounted onto the docking station carriage table 328. The docking stations is also precisely positionable sideways by a pair of linear translators 341. The docking station 330 comprises a housing having four linearly aligned bores 332, 334, 336, 338. Bore 332 is a through hole connecting target leading tube 315 and the top of the gate valve assembly 325. Bore 334 is provided to receive and store the target capsule apparatus pusher 225 component of the target pickup apparatus 220, when it is not in use. Bore 336 is provided to receive an assembled target capsule assembly 200 with its proximal end 212 in an upward position. Bore 338 is provided to receive an irradiated target capsule assembly 200 for dissolution therein of the molybdate ions and pertechnetate ions from the irradiated circular target plate 140.

In use, within a hot cell using remote-controlled devices (not shown), a Mo-100-coated target plate 140 is mounted into a target capsule assembly 200. The loaded target capsule assembly 200 is placed by the remote-controlled devices into target capsule assembly receiving bore 336 while docking station carriage table 328 is positioned by remote control forward and clear of upper shelf 306. Docking station carriage table 328 is then driven by remote control to a position under upper shelf 306 such that linearly aligned bores 332, 334, 336, 338 are centrally aligned with the gate valve assembly 325. The docking station 330 is then conveyed sideways to precisely position bore 336 underneath the target leading tube 315 thus being simultaneously positioned above gate valve assembly 325. The transfer drive unit assembly 310 is then operated to deploy sufficient steel tape to engage the target pickup apparatus 220 with the target capsule apparatus 200, and then, the transfer drive unit assembly 310 is reversed to draw the target capsule apparatus 200 up into target leading tube 315. The docking station 330 is moved to align bore 332 with the target leading tube 315 thus being simultaneously directly above gate valve assembly 325, after which actuator 326 is operated to open the gate valve. Release actuator 319 is operated to release the target capsule apparatus 200 from the target pickup apparatus 220 thereby allowing the target capsule apparatus 200 to fall through the bore of gate valve assembly 325 and into transfer tube 267. Then, docking station 330 is moved so that target capsule pusher receiving bore 334 is directly under the target leading tube 315. The transfer drive 310 is operated to engage the target pickup mechanism 220 with the target capsule apparatus pusher 225 by deploying steel tape from the drum within the transfer drive unit 310 by the pinch rollers 318 in cooperation with the pinch roller linear actuator 316, the pinch roller cam linkage 317 and the second one-way clutch and gear assembly 312 (first one-way clutch and gear assembly 311 operating freely (i.e. not transferring force), so that prongs 224 in the pickup head device 223 of the target pickup apparatus 220 engage the target capsule apparatus pusher 225. The target pickup apparatus 220 engaged with the pusher 225 is then drawn up into target leading tube 315 by first disengaging pinch rollers 318 by operating the pinch roller linear actuator 316 in cooperation with the pinch roller cam linkage 317, and then re-winding the steel tape onto the drum of transfer drive apparatus 310 with the first one-way clutch and gear assembly 311 in cooperation with the drive motor 313 (the second one-way clutch and gear assembly 312 operating freely (i.e. not transferring force). The docking station 330 is then moved so that bore 332 is directly under the target leading tube 95. The transfer drive apparatus 315 is then operated to deploy the steel tape by the pinch rollers 318 in cooperation with the pinch roller linear actuator 316, the cam linkage 317, and the second one-way clutch 312 (first one-way clutch and gear assembly 311 operating freely (i.e. not transferring force) so that the target pickup apparatus 220 with the pusher 225 pushes the target capsule assembly 200 through the transfer tube 267 to deliver the target capsule assembly 200 to a target station assembly (shown as 270 in FIGS. 24-27) that is operably coupled to a cyclotron.

Figure 27:
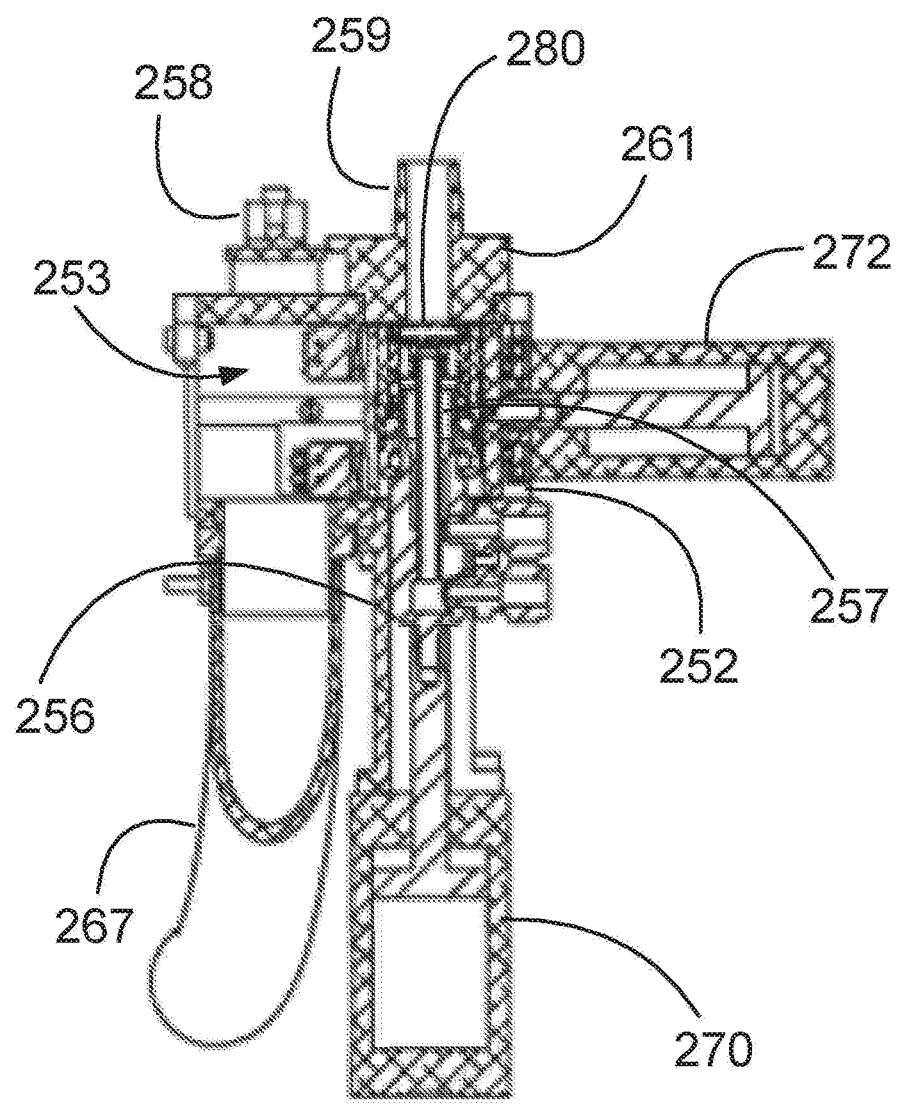
FIG. 27 is across-sectional top view of the target station apparatus shown in FIG. 24 with the exemplary target cell apparatus moved to a loaded position.

FIGS. 24-27 show a target station assembly 250 comprising an exemplary target station housing 252 for receiving a target capsule apparatus 200 delivered by a target pickup apparatus 220, wherein the target capsule apparatus 200 will then be mounted into a loaded position in the target station housing 252 (FIG. 27). The target station assembly 250 is mounted onto a PETtrace® cyclotron (not shown) by framework 251. The target station housing 252 is engaged to a cylindrical support element 256 to which is interconnected a first pneumatic drive cylinder 270. The target station housing 252 comprises a receiving chamber 253 (best seen in FIG. 27) and an irradiation chamber 254 (best seen in FIG. 26) provided with a port 259 for engaging a cyclotron proton emission port (not shown). The receiving chamber 253 is connected to a transfer tube 267 through which a target capsule apparatus 200 is delivered by a target pickup apparatus 220. The target capsule apparatus 200 is moved within target station housing 252 from the receiving chamber 253 to the irradiation chamber 254 by a target holder device 255 interconnected with a second pneumatic drive cylinder 272. Target holder device 255 is operably connected with limit switches 262 (FIG. 25) for remote sensing of the target capsule apparatus 200. Once the target capsule apparatus 200 is in the irradiation chamber 254, it is sealingly engaged with the target housing front flange 261 by the first pneumatic drive cylinder 270. The cylindrical support element target 256 comprises a cooling tube assembly 257 that is moved by the first pneumatic drive cylinder into the target capsule apparatus 220 once it has been installed in the irradiation chamber 254 and simultaneously pushes the target capsule apparatus against the target housing front flange 261 forming a vacuum tight seal. Accordingly port 259 is sealingly engaged with the cyclotron thus forming a contiguous vacuum chamber with the cyclotron and allowing the free passage of energetic protons to the target plate 140/199. The cooling tube assembly 257 engages with the cooling distribution sleeve 215 of the target capsule assembly to deliver cooling fluid through passages 218. After its installation into the target station irradiation chamber 254, the loaded target capsule assembly 200 is now ready for proton irradiation. After proton irradiation is complete, the cooling fluid is purged from the cooling tube assembly 257 and the cooling tube assembly withdrawn from the cooling distribution sleeve 215 by the first pneumatic drive cylinder 270. The irradiated target capsule assembly 200 is removed from the irradiation chamber 254 to the receiving chamber 253 of the target station housing 252 by operation of the second pneumatic drive cylinder 272. The irradiated target capsule assembly 200 is then recovered from the target station assembly 250 by engaging the pickup head device 223 of target pickup apparatus 220 with the chamber 212 in the proximal end of the target capsule assembly 200 in cooperation with the landing pad apparatus 258 and limit switches 262. The target capsule assembly 200 is then delivered back to the receiving cell apparatus 300 by recovery of the deployed steel tape 232 onto the drum provided in the drive unit assembly 310 by engagement of the first one-way clutch and gear assembly 311, until the target capsule unit 200 egresses from the transfer tube 267 and out of the gate valve assembly 325. The docking station 330 is then conveyed to position target plate dissolution module 338 precisely underneath the target leading tube 315. The drive unit assembly 310 is operated to press target capsule assembly 200 into the dissolution module 338 thereby forming a liquid tight seal between the target plate 140/199 and the dissolution module 338. As will be described in more detail later, the pertechnetate ions and molybdenate ions are then dissolved from the irradiated target plate, recovered and then separately purified.

Figure 28:
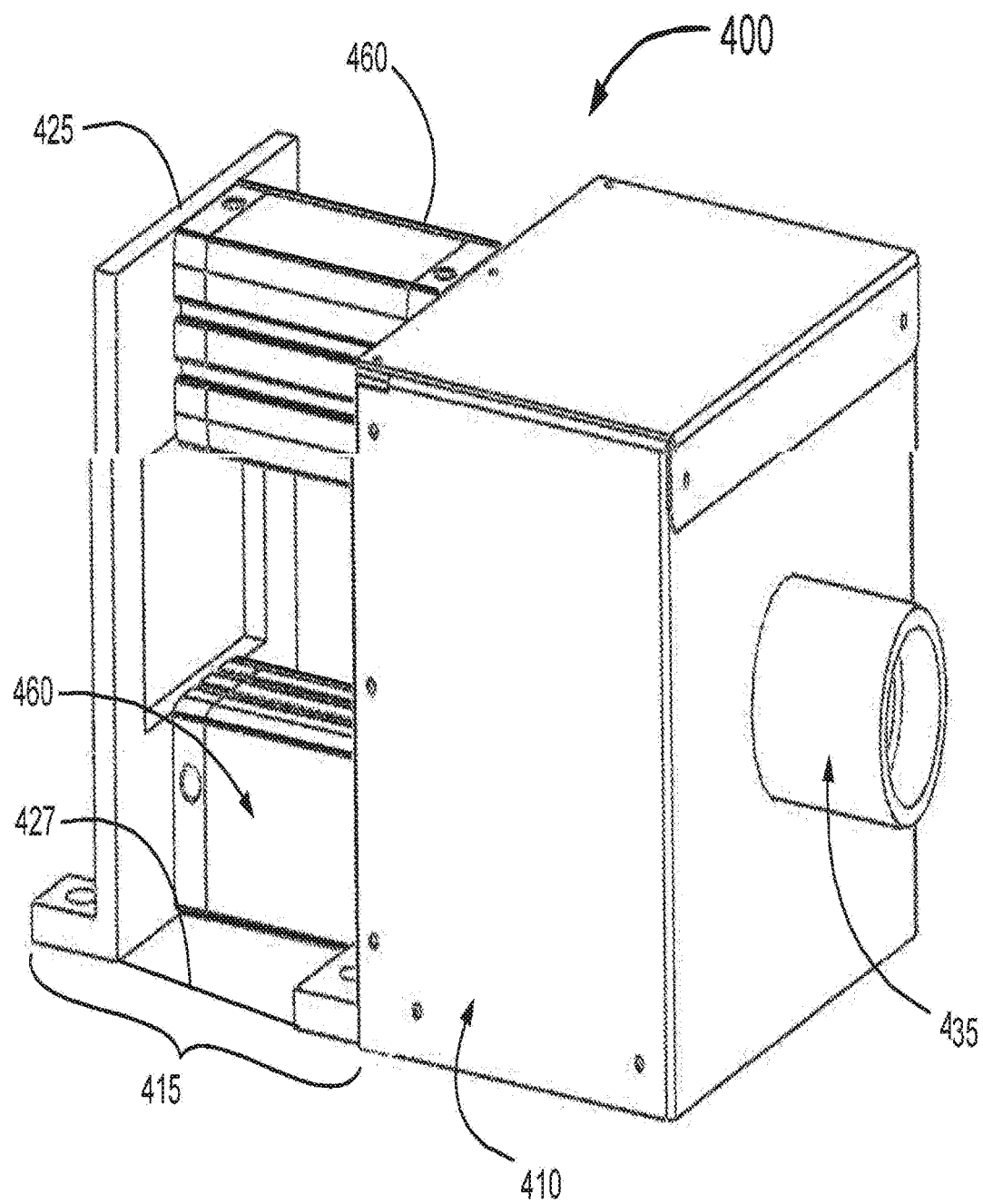
FIG. 28 is a perspective view of an exemplary booster station.
Figure 29:
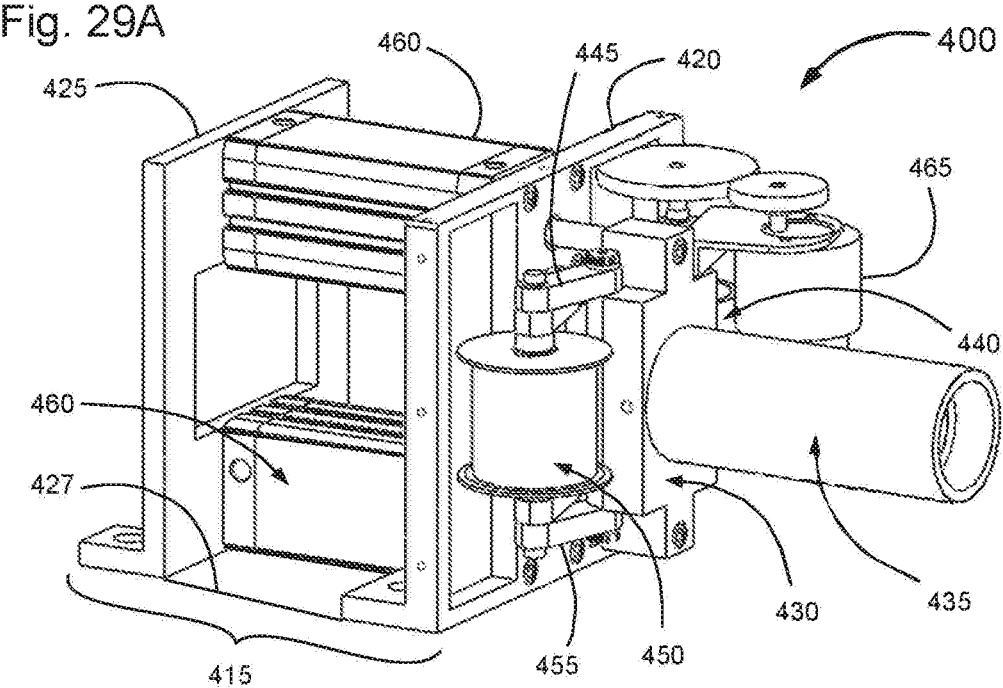
Figure 29:
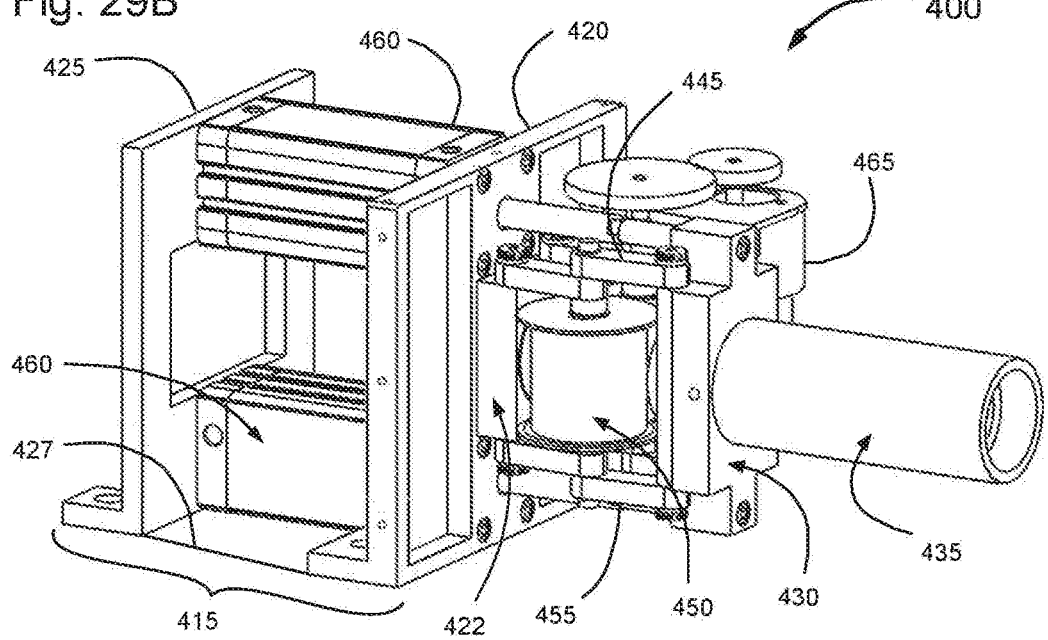

Due to facility design and space organization limitations, some cyclotron facilities may require locating a hot cell wherein installed an exemplary receiving cell apparatus according to the present disclosure, at some distance from the target station assembly mounted onto a cyclotron to which the receiving cell apparatus is connected by a transfer tube. As the length of the transfer tube and the number of bends that are required to navigate the distance between a receiving cell apparatus and a target station assembly, increase, so increases the stress and strain on the drive unit assembly and steel tape components of the receiving cell apparatus used to deliver and recover target capsule assemblies to and from the target station assembly. Accordingly, another embodiment of the present disclosure pertains to booster station apparatus that can be installed into a transfer tube interposed the receiving cell apparatus and the target station assembly. An exemplary booster station apparatus 400 is shown in FIGS. 28, 29A, 29B, and generally comprises a booster station framework 415 and a booster station housing 410. The booster station framework 415 comprises a transfer tube support plate 425 having an orifice through which a first transfer tube (not shown) is inserted, a booster housing back plate 420 and a framework stabilizing plate 427 having one end engaged with the transfer tube support plate 425 and the other end engaged with the booster housing back plate 420. The booster station apparatus is provided with a flange 422 (best seen in FIG. 29B) provided with an orifice for engaging the end of the first transfer tube. The housing 410 is provided with an orifice 412 aligned with the orifice of the flange 430 and flange 422. The orifice 412 in housing 410 allows insertion of a second transfer tube (not shown). The second transfer tube is engaged in the orifice of flange 430. A pinch roller assembly comprising an extendible/retractable framework comprising a pair of upper pivotable mount assemblies 445 unto which is mounted an upper roller 440, a pair of lower pivotable mount assemblies 455 unto which is mounted a lower roller 450, and flange 430 connecting a left-hand pair of an upper pivotable mount assembly and a lower pivotable mount assembly (both shown as 445, 455) with the corresponding right-hand pair (not shown) of an upper pivotable mount assembly and a lower pivotable mount assembly. A pair of actuators 460 for extending and retracting the pinch roller assembly 445, 455, 430 is mounted onto the booster station framework 415. A drive unit 465 is mounted onto the pinch roller assembly 445, 455, 430 for rotating the upper roller 440 when the pinch roller assembly 445, 455, 430 is extended. When the pinch roller assembly 445, 455, 430 is in a retracted position as shown in FIG. 29A, the upper roller 440 and the lower roller 450 are positioned further apart than the diameter of the target tube to allow a target capsule apparatus and target pickup apparatus to pass through the booster station. When the pinch roller assembly 445, 455, 430 is fully extended as shown in FIG. 29B, the upper roller 440 and lower roller 450 frictionally engage the upper and lower surfaces of the steel tape to deliver a motive force provided by the drive unit 465 to assist delivery of the target capsule apparatus to the target station assembly engaged with the cyclotron or to assist delivery of the target capsule apparatus to the receive cell depending on the direction of rotation of drive unit 465. The degree of friction provided is regulated by the pneumatic pressure delivered to linear actuators 460.

Another exemplary aspect of this embodiment of the present disclosure relates to a process for the dissolution of and recovery of molybdate ions and pertechnetate ions from proton-irradiated target plates, followed by separation of and separate purification of the molybdate ions and pertechnetate ions. The exposed surfaces of a proton-irradiated target plate is contacted with a recirculating solution of about 3% to about 30% $H_2O_2$ for about 2 min to about 30 min to dissolve the molybdate ions and pertechnetate ions from the surface of the target plate thereby forming an oxide solution. The peroxide solution may be recirculated. The peroxide solution may be heated, for example, by heating the dissolution chamber 338 with heater cartridges placed in the body of the chamber. The oxide solution is recovered after which, the dissolution system and the target plate are rinsed and flushed with distilled deionized water. The rinsing/flushing water is added to and intermixed with the oxide solution. The pH of the recovered oxide/rinsing solution is then adjusted to about 14 by the mixing in of about 1N to about 10N of KOH or alternatively, about 1N to about 10N NaOH, after which, the pH-adjusted oxide/rinsing solution may be heated to about 80° C. for about 2 min to about 30 min to degrade any residual $H_2O_2$ in the pH-adjusted oxide/rinsing solution. The strongly basic pH of the oxide/rinsing solution maintains the molybdenum and technetium species as $K_2[MoO_4]$ or $Na_2[MoO_4]$ and $K[TcO_4]$ or $Na[TcO_4]$ ions respectively, or forms exemplified by $Mo_2(OH)(OOH)$, $H_2Mo_2O_3(O_2)_4$, $H_2MoO_2(O_2)$, and the like.

The pH-adjusted (and optionally heated) oxide/rinsing solution is then pushed through a solid-phase extraction (SPE) column loaded with a commercial resin exemplified by DOWEX® 1X8, ABEC-2000, Anilig Tc-02, and the like (DOWEX is a registered trademark of the Dow Chemical Co., Midland, Mich., USA). The pertechnetate ions are immobilized onto the resin beads while molybdate ions in solution pass through and egress the SPE column. The molybdate ion solution is collected in a reservoir. The SPE column is then rinsed with a suitable solution so as to maintain pertechnetate affinity for the SPE column, but to ensure molybdate and other impurities have been removed. The rinse solution is added to collected molybdate ion solution. The pertechnetate ions are then eluted from the SPE column with tetrabutylammonium bromide (5-10 mL) in $CHCl_3$ (0.1-1.0 mg/mL). Alternatively, the pertechnetate ions can be eluted from the SPE column with NaI (0.1-1.0 mg/mL).

The pertechnetate ion solution eluted from the SPE column is pushed through an alumina column preceded by an appropriate column to remove elution components For Dowex®/ABEC, the alumina column is preceded by a cation exchange SPE cartridge to remove residual base from the eluent. The alumina column can also be preceded by an SPE cartridge to remove iodide from the eluent, wherein the pertechnetate is immobilized on the alumina. It is optional to use NaI to remove $TcO_4$, in which case, asn Ag/AgCl SPE cartridge is required in from of the alumina column. The adsorbed pertechnetate ions are washed with water, and then eluted with a saline solution comprising 0.9% NaCl (w/v) through a 0.2 micron filter and collected into vials in lead-shielded containers. The eluant from the alumina column comprises pure and sterile $Na[TcO_4]$.

The molybdate ion/rinse water solution collected from the SPE column is dried. Suitable drying methods are exemplified by lyophilization. The resulting powder is suspended in a NaOH solution of about 3% to about 35% or alternatively, a KOH solution of about 3% to about 35%, after which the solution may be filtered and dried. The resulting powder is solubilized in distilled water and dried again to provide a clean $Na_2MoO_4$ product or alternatively, a $K_2MoO_4$ product. The $Na_2MoO_4$ or $K_2MoO_4$ is then pushed through a strongly acidic cation exchange column to enable recovery and elution of $H_2[MoO_4]$ and other polymeric oxide species of molybdenum exemplified by heptamolybdate, octamolybdate. The eluted molybdate oxides are then frozen, dried and stored. The dried molybdate oxide powders thus recovered and stored can be reduced as described above for coating, onto fresh target plates.

Accordingly, another exemplary embodiment of the present disclosure pertains to systems and apparatus, also collectively referred to as dissolution/purification modules, that are engagible and cooperable with the exemplary receiving cell apparatus disclosed herein, for receiving and mounting therein irradiated Mo-100-coated target plates for dissolution, recovery and purification of molybdate ions and pertehnetate ions. The exemplary dissolution/purification modules of this embodiment of the disclosure generally comprise:

(i) a sealable container for remotely mounting therein an irradiated Mo-100-coated target plate (referred to as the "dissolution chamber");

(ii) a recirculating supply of an $H_2O_2$ solution comprising a reservoir, a conduit infrastructure interconnecting the reservoir and the dissolution container, pumps for recirculating the $H_2O_2$ solution, ingress ports for providing inputs of fresh $H_2O_2$ solution, egress ports for controllably removing portions of the recirculating $H_2O_2$ solution, and instrumentation for monitoring radioactivity, temperature, flow rates and the like in the recirculating $H_2O_2$ solution;

a supply of distilled water interconnected with the dissolution container for post-dissolution washing of the dissolution container and the recirculating supply of the $H_2O_2$ solution;

(iv) a chemical processing station comprising a plurality of ports for individually engaging therewith disposable resin cartridges for immobilizing thereon and mobilizing therefrom pertechnetate ions and molybdate ions, a conduit infrastructure for separately recovering pertechnetate ions, molybdate ions, and waste washings from the resin cartridges, and a filling/capping station for capturing acid storing the recovered pertechnetate ions, molybdate ions, and waste washings.

What is claimed is:

1. A system for producing technetium-99m from molybdenum-100, comprising:

a target capsule apparatus comprising a target plate holder and a cover plate housing therein a Mo-100-coated target plate secured between the target plate holder and the cover plate, wherein the Mo-100-coated target plate comprises a transition metal target plate coated with Mo-100 particles having a grain size of less than 10 microns;

a target station apparatus comprising a housing configured to receive and mount therein the target capsule apparatus, wherein the target station apparatus is operatively coupled to a cyclotron for irradiating the Mo-100-coated target plate with protons;

a target capsule pickup apparatus comprising an engagement device configured to engage with the target capsule apparatus and the target capsule apparatus into the target station apparatus;

a receiving cell apparatus comprising a docking station configured to receive the target capsule apparatus after proton irradiation in the target station apparatus and a transfer tube interconnecting the docking station and the target station apparatus, wherein the transfer tube is configured to convey the target capsule apparatus from the target station to the docking station;

a dissolution/purification module operatively coupled to the docking station and configured to receive therein the proton-irradiated Mo-100-coated target plate for dissolution, recovery and purification of molybdate ions and pertechnetate ions from the proton-irradiated Mo-100-coated target plate; and a supply of oxygen-free atmosphere to the target station apparatus.

2. The system of claim 1, wherein the transfer tube comprises a booster station comprising a booster station network and a booster station housing comprising a back plate, wherein the booster station network comprises:

a transfer tube support plate having an orifice through which the transfer tube is inserted; and a framework stabilizing plate engaged with the transfer tube support plate and the booster housing back plate.

3. The system of claim 1, wherein the target plate holder comprises first and second ports sealingly engaged with a coolant supply; wherein coolant ingresses at the first ports, and egresses from the second port; and wherein the coolant is directed via a plurality of channel to contact and flow underneath the Mo-100-coated target plate.

4. The system of claim 1, wherein an upper surface of the target plate holder is inclined at an angle of less than about 90° relative to a horizontal plane; and wherein a lower surface of the cover plate is inclined at a matching angle to the upper surface of the target plate holder.

5. The system of claim 4, wherein the upper surface of the target plate holder is inclined at an angle from a range of about 5° to about 85° relative to the horizontal plane.

6. The system of claim 4, wherein the upper surface of the target plate holder is inclined at an angle from a range of about 10° relative to the horizontal plane.

7. The system of claim 1, wherein the supply of oxygen-free atmosphere is a vacuum.

8. The system of claim 1, wherein the supply of oxygen-free atmosphere is an inert gas.

9. The system of claim 8, wherein the inert gas comprises helium, argon, or combination thereof.

10. The system of claim 1, wherein the proton irradiation comprises protons delivered in a beamline to the Mo-100-coated target plate at an angle of less than 90°.

11. The system of claim 10, wherein the angle is about 10°.

12. The system of claim 1, wherein the Mo-100-coated target plate is elongate.

13. The system of claim 1, wherein the Mo-100-coated target plate is circular.

* * * * *